US012803232B2

(12) United States Patent
Yang et al.

(10) Patent No.: US 12,803,232 B2
(45) Date of Patent: Nov. 17, 2026

(54) HIGH-DENSITY ELECTRICAL CONNECTOR

(71) Applicant: ATL Technology, LLC, Springville, UT (US)

(72) Inventors: Tyler Yang, Provo, UT (US); Darrell E. Goff, Highland, UT (US); James Alan Dickson, Newport (GB); Amarjot Kaur Saggu, Newport (GB); Richard John Hoodless, Kingswood (GB); Sunil Rupalia, Llandough (GB); Christopher Benn, Caerphilly (GB); Sam Mclelland, Helston (GB); David Wyn Morris, Cardiff (GB)

(73) Assignee: ATL TECHNOLOGY, LLC, Springville, UT (US)

( * ) Notice: Subject to any disclaimer, the term of this patent is extended or adjusted under 35 U.S.C. 154(b) by 318 days.

(21) Appl. No.: 18/759,856

(22) Filed: Jun. 29, 2024

(65) Prior Publication Data

US 2025/0007225 A1 Jan. 2, 2025

Related U.S. Application Data

(60) Provisional application No. 63/524,374, filed on Jun. 30, 2023.

(51) Int. Cl.

*H01R 24/40* (2011.01)
*H01R 12/78* (2011.01)

(Continued)

(52) U.S. Cl.

CPC ............ *H01R 24/40* (2013.01); *H01R 12/78* (2013.01); *H01R 13/20* (2013.01); *H01R 13/639* (2013.01); *H01R 2107/00* (2013.01)

(58) Field of Classification Search

CPC ........ H01R 24/40; H01R 12/78; H01R 13/20; H01R 13/639; H01R 2107/00

(Continued)

(56) References Cited

U.S. PATENT DOCUMENTS

| | | | |
|---|---|---|---|
| 2,396,725 | A | 3/1946 | Thomas et al. |
| 3,718,859 | A | 2/1973 | Arlow |

(Continued)

FOREIGN PATENT DOCUMENTS

| | | |
|---|---|---|
| CN | 204333521 | 5/2015 |
| CN | 205335533 | 6/2016 |

(Continued)

*Primary Examiner* — Gary F Paumen
(74) *Attorney, Agent, or Firm* — Massey Bean & Lewis

(57) ABSTRACT

An electrical connector includes a receptacle and a plug. The receptacle includes a first annular flexible circuit board and first electrical contacts coupled to the first annular flexible circuit board, electrically isolated from each other, and arranged in at least one receptacle annular pattern. The plug includes a second annular flexible circuit board and second electrical contacts coupled to the second annular flexible circuit board, electrically isolated from each other, and arranged in at least one plug annular pattern. The plug is selectively connectable with the receptacle. When the plug is selectively connected with the receptacle, each one of the first electrical contacts of the receptacle is in physical contact with a corresponding one of the second electrical contacts of the plug.

24 Claims, 21 Drawing Sheets

(51) Int. Cl.

| | |
|---|---|
| ***H01R 13/20*** | (2006.01) |
| ***H01R 13/639*** | (2006.01) |
| ***H01R 107/00*** | (2006.01) |

(58) Field of Classification Search

USPC .............................................. 439/65, 67, 492

See application file for complete search history.

(56) References Cited

U.S. PATENT DOCUMENTS

| | | | | |
|---|---|---|---|---|
| 3,853,376 | A | 12/1974 | Marechal | |
| 5,026,300 | A | 6/1991 | Varner | |
| 5,181,859 | A | 1/1993 | Foreman et al. | |
| 5,348,498 | A | 9/1994 | Morello et al. | |
| 5,484,294 | A * | 1/1996 | Sobhani | H01R 39/10 439/21 |
| 5,568,348 | A | 10/1996 | Foreman et al. | |
| 5,632,655 | A | 5/1997 | DeMarco | |
| 5,759,047 | A * | 6/1998 | Brodsky | H01R 12/62 439/67 |
| 5,953,815 | A | 9/1999 | Kaminski et al. | |
| 5,993,242 | A | 11/1999 | Zell et al. | |
| 6,652,319 | B1 | 11/2003 | Billman | |
| 7,553,166 | B2 * | 6/2009 | Gobron | H05K 3/365 439/287 |
| 7,914,344 | B2 | 3/2011 | Tin et al. | |
| 7,922,529 | B1 | 4/2011 | Meurer | |
| 9,966,713 | B1 | 5/2018 | Shaeffer et al. | |
| 10,856,416 | B2 * | 12/2020 | Rasmussen | H01R 12/592 |
| 10,931,069 | B2 | 2/2021 | Kunz | |
| 11,381,033 | B2 | 7/2022 | Johnson | |
| 2007/0184682 | A1 * | 8/2007 | Gobron | H05K 3/365 439/67 |
| 2024/0088609 | A1 | 3/2024 | Yang et al. | |

FOREIGN PATENT DOCUMENTS

| | | |
|---|---|---|
| GB | 1239070 | 7/1971 |
| JP | 5109435 | 4/1993 |

* cited by examiner

HIGH-DENSITY ELECTRICAL CONNECTOR

CROSS-REFERENCE TO RELATED APPLICATION

This application claims the benefit of U.S. Provisional Patent Application No. 63/524,374, filed Jun. 30, 2023, which is incorporated herein by reference in its entirety.

FIELD

This application relates generally to electrical components, and more specifically to an electrical connector having a plug and a receptacle.

BACKGROUND

Conventional high-density electrical connectors include planar rows of stacked electrical contact boards. Because any one of the boards may unpredictably act as a primary datum, as a plug of the connector is inserted into a receptacle of the connector, misalignment of or unreliable connections between the other of the boards may occur. Accordingly, predictably aligning multiple groupings of electrical contacts in a high-density electrical connector can be difficult. Additionally, manufacturing a high-density electrical connector in a cost-effective and efficient manner can also be difficult.

SUMMARY

The subject matter of the present application has been developed in response to the present state of the art, and in particular, in response to the problems and needs of conventional devices or products for providing a high-density electrical connection between a tool and a tool control system that have not yet been fully solved. The subject matter of the present application has been developed to provide an electrical connector that facilitates a high-density electrical connection that overcomes many of the shortcomings of the prior art.

Disclosed herein is an electrical connector that includes a receptacle and a plug. The receptacle includes a first annular flexible circuit board and first electrical contacts coupled to the first annular flexible circuit board, electrically isolated from each other, and arranged in at least one receptacle annular pattern. The plug includes a second annular flexible circuit board and second electrical contacts coupled to the second annular flexible circuit board, electrically isolated from each other, and arranged in at least one plug annular pattern. The plug is selectively connectable with the receptacle. When the plug is selectively connected with the receptacle, each one of the first electrical contacts of the receptacle is in physical contact with a corresponding one of the second electrical contacts of the plug. The preceding subject matter of this paragraph characterizes example 1 of the present disclosure.

The first electrical contacts of the receptacle are electrical contact pads. The second electrical contacts of the plug are flexible electrical contacts. The preceding subject matter of this paragraph characterizes example 2 of the present disclosure, wherein example 2 also includes the subject matter according to example 1, above.

The first annular flexible circuit board of the receptacle includes a first outer surface and a first inner surface separated from the first outer surface by a thickness of the first annular flexible circuit board. The receptacle includes multiple receptacle annular patterns. One of the receptacle annular patterns is attached to the first outer surface of the first annular flexible circuit board and another one of the receptacle annular patterns is attached to the first inner surface of the first annular flexible circuit board. The second annular flexible circuit board of the plug includes a second outer surface and a second inner surface separated from the first outer surface by a thickness of the second annular flexible circuit board. The plug comprises multiple plug annular patterns. One of the plug annular patterns is attached to the second outer surface of the second annular flexible circuit board and another one of the plug annular patterns is attached to the second inner surface of the second annular flexible circuit board. The preceding subject matter of this paragraph characterizes example 3 of the present disclosure, wherein example 3 also includes the subject matter according to any of examples 1-2, above.

The second electrical contacts of the plug are flexible electrical contacts. Each one of the flexible electrical contacts includes an elongated arm and a contact rib protruding from the elongated arm. The preceding subject matter of this paragraph characterizes example 4 of the present disclosure, wherein example 4 also includes the subject matter according to example 3, above.

Each one of the flexible electrical contacts of the plug annular pattern attached to the second outer surface forms a pair of flexible electrical contacts with a corresponding one of the flexible electrical contacts of the plug annular pattern attached to the second inner surface. When the plug is not selectively connected with the receptacle, the contact ribs of each pair of flexible electrical contacts are in contact with each other. When the plug is selectively connected with the receptacle, the contact rib of a first one of the flexible electrical contacts of each pair of flexible electrical contacts is in physical contact with a corresponding one of the first electrical contacts of the receptacle annular pattern attached to the first outer surface of the first annular flexible circuit board and the contact rib of a second one of the flexible electrical contacts of each pair of flexible electrical contacts is in physical contact with a corresponding one of the first electrical contacts of the receptacle annular pattern attached to the first inner surface of the first annular flexible circuit board. The preceding subject matter of this paragraph characterizes example 5 of the present disclosure, wherein example 4 also includes the subject matter according to example 4, above.

The contact ribs of each pair of flexible electrical contacts are staggered relative to each other in a direction parallel to a central axis of the plug. The preceding subject matter of this paragraph characterizes example 6 of the present disclosure, wherein example 6 also includes the subject matter according to example 4, above.

The contact rib of each one of the flexible electrical contacts is elongated, in a direction parallel to a central axis of the plug, and angled relative to the central axis of the plug. The preceding subject matter of this paragraph characterizes example 7 of the present disclosure, wherein example 7 also includes the subject matter according to any of examples 4-6, above.

For each one of the flexible electrical contacts, a width of the contact rib is less than 60% of a width of the flexible electrical contact. The preceding subject matter of this paragraph characterizes example 8 of the present disclosure, wherein example 8 also includes the subject matter according to any one of examples 6 or 7, above.

For each one of the flexible electrical contacts, a length of the contact rib is less than 10% of a length of the flexible electrical contact. The preceding subject matter of this paragraph characterizes example 9 of the present disclosure, wherein example 9 also includes the subject matter according to any of examples 6-8, above.

The receptacle further includes a solder mask on the first annular flexible circuit board between the first electrical contacts. The first electrical contacts are recessed relative to the solder mask. The preceding subject matter of this paragraph characterizes example 10 of the present disclosure, wherein example 10 also includes the subject matter according to any of examples 1-9, above.

At least one of the receptacle includes a receptacle housing that includes a plurality of posts, the first annular flexible circuit board includes opposing first side portions overlapping each other and each includes a plurality of openings, each one of the openings of a first one of the opposing first side portions is aligned with a corresponding one of the openings of a second one of the opposing first side portions, and each one of the plurality of posts passes through a corresponding one of multiple pairs of aligned openings of the opposing first side portions. Or, at least one of the receptacle includes the plug includes a plug housing that includes a plurality of posts, the second annular flexible circuit board includes opposing second side portions overlapping each other and each comprising a plurality of openings, each one of the openings of a first one of the opposing second side portions is aligned with a corresponding one of the openings of a second one of the opposing second side portions, and each one of the plurality of posts passes through a corresponding one of multiple pairs of aligned openings of the opposing second side portions. The preceding subject matter of this paragraph characterizes example 11 of the present disclosure, wherein example 11 also includes the subject matter according to any of examples 1-10, above.

When the receptacle includes a receptacle housing that includes a plurality of posts, each one of the plurality of posts has a retention portion larger than the aligned openings of the corresponding one of the multiple pairs of aligned openings of the opposing first side portions so that each one of the multiple pairs of aligned openings of the opposing first side portions is retained on a corresponding one of the plurality of posts. When the plug includes a plug housing that includes a plurality of posts, each one of the plurality of posts has a retention portion larger than the aligned openings of the corresponding one of the multiple pairs of aligned openings of the opposing second side portions so that each one of the multiple pairs of aligned openings of the opposing second side portions is retained on a corresponding one of the plurality of posts. The preceding subject matter of this paragraph characterizes example 12 of the present disclosure, wherein example 12 also includes the subject matter according to example 11, above.

When the receptacle includes a receptacle housing that includes a plurality of posts, the plurality of posts of the receptacle housing are retained within the multiple pairs of aligned openings via an adhesive. When the plug includes a plug housing that includes a plurality of posts, the plurality of posts of the plug housing are retained within the multiple pairs of aligned openings via an adhesive. The preceding subject matter of this paragraph characterizes example 13 of the present disclosure, wherein example 13 also includes the subject matter according to example 11, above.

The first annular flexible circuit board includes opposing first side portions overlapping each other and joined together by a plurality of first solder bridges. The second annular flexible circuit board includes opposing second side portions overlapping each other and joined together by a plurality of second solder bridges. The preceding subject matter of this paragraph characterizes example 14 of the present disclosure, wherein example 14 also includes the subject matter according to any of examples 1-10, above.

The first annular flexible circuit board includes opposing first side portions overlapping each other and joined together by an adhesive. The second annular flexible circuit board includes opposing second side portions overlapping each other and joined together by an adhesive. The preceding subject matter of this paragraph characterizes example 15 of the present disclosure, wherein example 15 also includes the subject matter according to any of examples 1-10, above.

At least one of the first annular flexible circuit board includes opposing first sides interlocked with each other via a plurality of first interlocking features formed in the opposing first sides, or the second annular flexible circuit board includes opposing second sides interlocked with each other via a plurality of second interlocking features formed in the opposing second sides. The preceding subject matter of this paragraph characterizes example 16 of the present disclosure, wherein example 16 also includes the subject matter according to any of examples 1-10, above.

The plug includes an inner annular chamfer configured to slidably engage the first annular flexible circuit board as the plug is selectively connected with the receptacle and when the first annular flexible circuit is radially inwardly lopsided. The preceding subject matter of this paragraph characterizes example 17 of the present disclosure, wherein example 17 also includes the subject matter according to any of examples 1-16, above.

The plug includes an outer annular chamfer configured to slidably engage the first annular flexible circuit board as the plug is selectively connected with the receptacle and when the first annular flexible circuit is radially outwardly lopsided. The preceding subject matter of this paragraph characterizes example 18 of the present disclosure, wherein example 18 also includes the subject matter according to example 17, above.

The inner annular chamfer is axially offset, along a central axis of the electrical connector, relative to the outer annular chamfer. The preceding subject matter of this paragraph characterizes example 19 of the present disclosure, wherein example 19 also includes the subject matter according to example 18, above.

The first electrical contacts are arranged in at least one receptacle annular pattern. The first electrical contacts of the at least one receptacle annular pattern are not staggered relative to each other. The first electrical contacts of any one of the at least one receptacle annular pattern are not staggered relative to the first electrical contacts of any other one of the at least one receptacle annular pattern. The preceding subject matter of this paragraph characterizes example 20 of the present disclosure, wherein example 20 also includes the subject matter according to any of examples 1-19, above.

The first electrical contacts are arranged in at least two receptacle annular patterns. The first electrical contacts of a first one of the at least two receptacle annular patterns are staggered relative to the first electrical contacts of a second one of the at least two receptacle annular patterns. The preceding subject matter of this paragraph characterizes example 21 of the present disclosure, wherein example 21 also includes the subject matter according to any of examples 1-20, above.

The receptacle further includes a first central interface concentric with the first annular flexible circuit board, located radially inwardly relative to the first annular flexible circuit board, and includes first ones of electrical, fluidic, or pneumatic connectors. The plug further includes a second central interface concentric with the second annular flexible circuit board, located radially inwardly relative to the second annular flexible circuit board, and includes second ones of electrical, fluidic, or pneumatic connectors. When the plug is selectively connected with the receptacle, the first ones of the electrical, fluidic, or pneumatic connectors are electrically, fluidically, or pneumatically connected with corresponding ones of the second ones of the electrical, fluidic, or pneumatic connectors. The preceding subject matter of this paragraph characterizes example 22 of the present disclosure, wherein example 22 also includes the subject matter according to any of examples 1-21, above.

Further disclosed herein, a system that includes an electrical connector including a receptacle including a first annular flexible circuit board and electrical contacts coupled to the first annular flexible circuit board, electrically isolated from each other, and arranged in two receptacle annular patterns. The system also includes a plug including a second annular flexible circuit board and flexible electrical contacts coupled to the second annular flexible circuit board, electrically isolated from each other, and arranged in two plug annular patterns. The plug is selectively connectable with the receptacle. When the plug is selectively connected with the receptacle, each one of the electrical contacts of the receptacle is in physical contact with a corresponding one of the flexible electrical contacts of the plug. When the plug is not selectively connected with the receptacle, each one of the flexible electrical contacts of a first one of the two plug annular patterns is in contact with a corresponding one of the flexible electrical contacts of a second one of the two plug annular patterns. The system also includes a tool electrically coupled with the plug. The preceding subject matter of this paragraph characterizes example 23 of the present disclosure.

The tool is configured to detect, by sensing a short circuit, whether any one of the flexible electrical contacts of the first one of the two plug annular patterns is in contact with the corresponding one of the flexible electrical contacts of the second one of the two plug annular patterns when the plug is selectively connected with the receptacle. The preceding subject matter of this paragraph characterizes example 24 of the present disclosure, wherein example 24 also includes the subject matter according to example 23, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Figure 1:
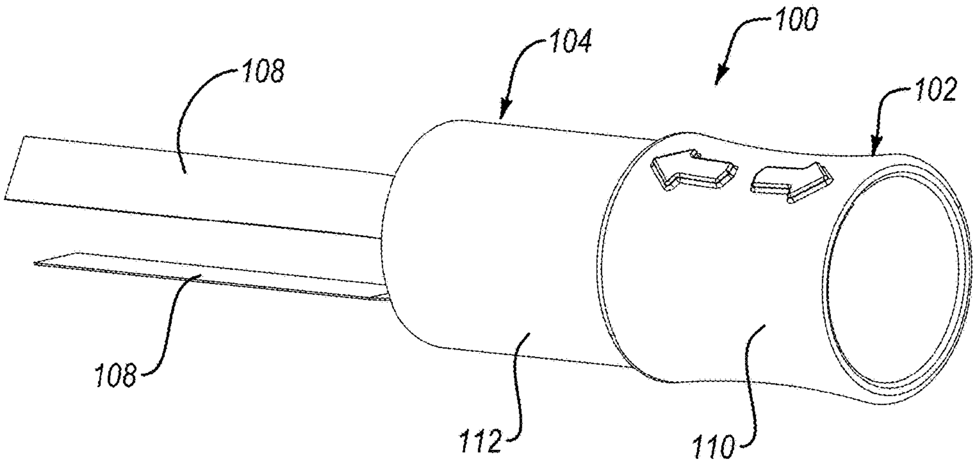
FIG. 1 is a perspective view of an electrical connector, according to one or more examples of the present disclosure.
Figure 2:
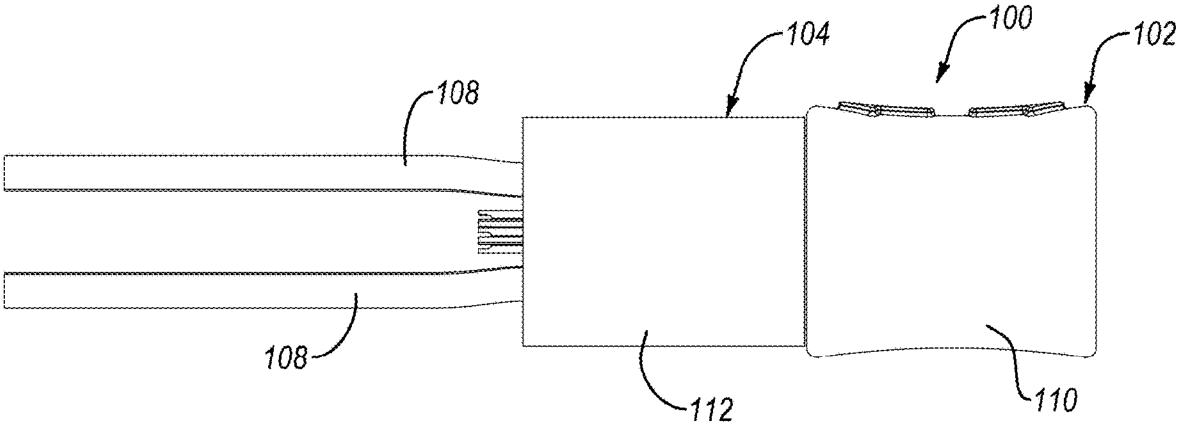
FIG. 2 is a side elevation view of the electrical connector of FIG. 1, according to one or more examples of the present disclosure.
Figure 3:
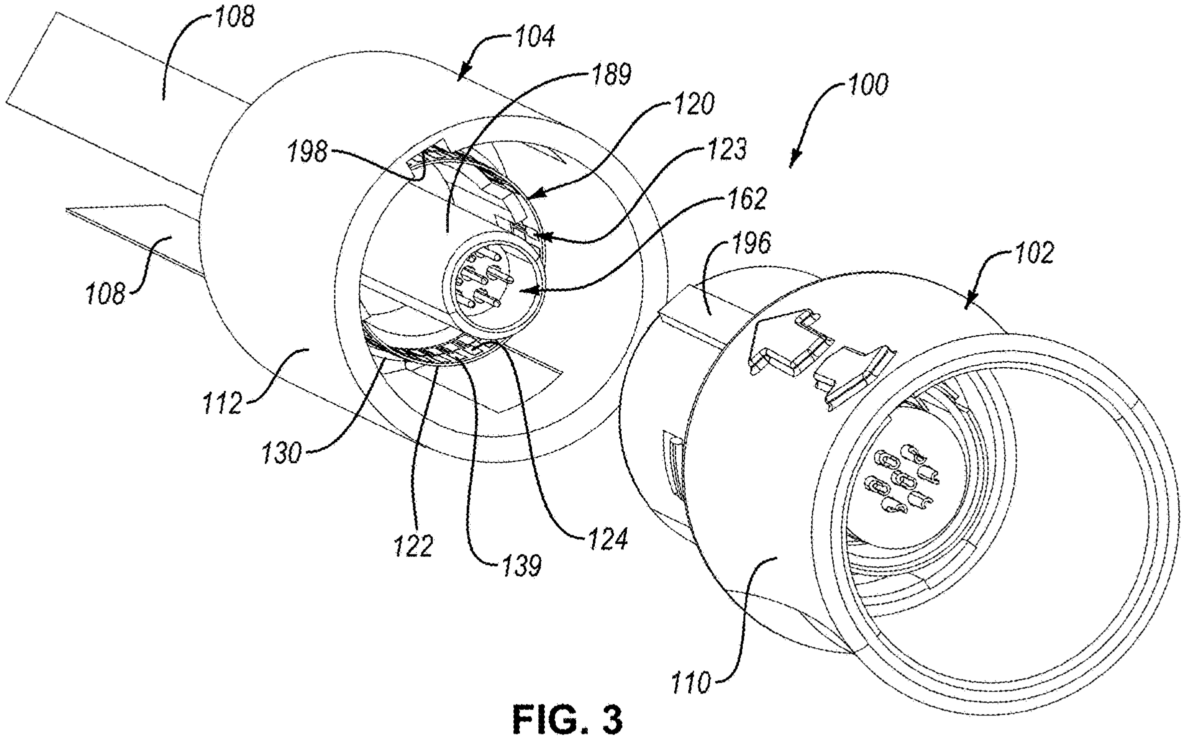
FIG. 3 is a perspective view of the electrical connector of FIG. 1, showing a plug and a receptacle of the electrical connector separated and shown from a plug side of the electrical connector, according to one or more examples of the present disclosure.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Referring to FIGS. 1-4, one example of an electrical connector 100 includes a plug 102 and a receptacle 104. The electrical connector 100 is considered a high-density electrical connector because the electrical connector 100 has a high density of electrical contacts or terminals each configured to transmit electrical signals between the plug 102 and the receptacle 104 when connected. Generally, the majority of the electrical contacts of the electrical connector 100 are arranged circumferentially or annularly about a common axis (e.g., central axis 195 of FIGS. 9, 11-13, and 15). Coaxial and rotational alignment of the plug 102 and the receptacle 104 ensures proper alignment of corresponding electrical contacts of the plug 102 and the receptacle 104. Moreover, coaxial and rotational alignment of the plug 102 and the receptacle 104 is based on initial alignment of a single, predictable primary datum independent of the electrical contacts. Such a configuration is advantageous over conventional high-density electrical connectors with rows of stacked electrical contact boards because any one of the boards may unpredictably act as the primary datum, which may result in a misalignment of or unreliable connections between the other of the boards.

The receptacle 104 includes a housing 112 and circuit boards 108 extending from the housing 112. The circuit boards 108 may include electrical traces imprinted on an electrically-insulating substrate. Moreover, in some implementations, the circuit boards 108 can be flexible circuit boards. Each circuit board 108 is electrically coupled to one or more electrical contacts of the receptacle 104 at one end and other electrical connections (not shown), such as those of a medical tool, device, or system, at an opposite end.

The receptacle 104 further includes an annular flexible circuit board (FCB) 120 housed within an interior cavity of the housing 112. The housing 112 is configured to retain the annular FCB 120 so that the annular FCB 120 does not move relative to the housing 112 and so that an engagement end portion 139 of the annular FCB 120 (see, e.g., FIG. 3) is suspended within the interior cavity of the housing 112. As defined herein, the engagement end portion 139 is suspended within the interior cavity when a radially outer surface and a radially inner surface of the engagement end portion 139 are spaced apart from the housing 112 so that a gap is defined between the housing 112 and the radially outer surface and the radially inner surface. This gap enables the flexible electrical contacts 142 of the plug 102 to engage the electrical contact pads 124 from both sides of the annular FCB 120. As defined herein, annular can mean a full or partial ring-like or circular shape.

The annular FCB 120 includes a flexible substrate 122 and electrical contact pads 124 (e.g., electrical contacts) formed on the flexible substrate 122 in a set or sets of annular patterns along a circumference of the flexible substrate 122. In one example, the flexible substrate 122 is initially flat and flexed into an annular or circular shape during assembly of the receptacle 104. The electrical contact pads 124 form an electrical contact-pad interface 123. The electrical contact pads 124 are located on the flexible substrate 122 at the engagement end portion 139 of the annular FCB 120 and are suspended within the interior cavity of the housing 112. The electrical contact pads 124 can be formed on the flexible substrate 122, as surface-mount pads, using any of various deposition techniques, such as printing, etching, masking, and the like. The set of annular patterns of the electrical contact pads 124 are staggered relative to each other as described in more detail below. Each one of the electrical contact pads 124 is electrically coupled with an electrical trace formed in or on the flexible substrate 122. The electrical traces facilitate the transmission of electrical signals between the electrical contact pads 124 and a corresponding one of the circuit boards 108. In some examples, the flexible substrate 122 includes multiple layers and the electrical traces are interposed between layers of the flexible substrate 122. The electrical contact pads 124 (and the corresponding traces) are electrically isolated from each other such that each electrical contact pad 124 facilitates a separate isolated electrical connection.

To help retain the annular FCB 120 to the housing 112, in some alternative examples, the receptacle 104 can further include a board retention ring 130 that extends around a distal end portion of the annular FCB 120, opposite the engagement end portion 139, to effectively clamp the annular FCB 120 to the housing 112 or other portion of the receptacle 104 (see, e.g., FIGS. 5-8). When used, the board retention ring 130 can be formed separately from the housing 112 and is slid over the annular FCB 120 and an interior mounting ring of the housing 112, and forms a friction or interference fit with the annular FCB 120.

The housing 112 additionally includes an annular tube 189 that is concentric with the central axis 195. The annular tube 189 is located radially inwardly and spaced apart from the annular FCB 120. Moreover, the annular tube 189 encircles a central pin interface 162 of the receptacle 104. However, in other embodiments, instead of an annular tube 189, the housing 112 may have a central engagement element that is configured to engage a corresponding engagement element formed in a housing 110 of the plug 102.

The central pin interface 162 is concentric with the central axis 195 and includes a plurality of spaced-apart electrical pins. The electrical pins are positioned within corresponding channels formed in the housing 112. Although not shown, the electrical pins are electrically coupled to other electrical connections (not shown), such as those of a medical tool control system or medical device. The central pin interface 162 can have any number of electrical pins. For example, the central pin interface 162 has eight electrical pins in certain instances. However, in other examples, the central pin interface 162 can have fewer than eight electrical pins (e.g., one to seven electrical pins) or more than eight electrical pins (e.g., twelve, eighteen, or more electrical pins). The electrical pins are made of an electrically conductive material. In one implementation, the electrical pins are configured to transmit electrical power and the electrical contact pads 124 are configured to transmit electrical communication signals.

Although the central pin interface 162 in the illustrated embodiment facilitates electrical connections, in other embodiments, the central pin interface 162 may be modified to facilitate connections of other types, such as fiber optic, fluidic, pneumatic, and the like. Accordingly, in some implementations, the central pin interface 162 can be interchangeable or reconfigurable to meet any of various interconnect capabilities, such as those demanded by a customer. Furthermore, in some implementations, the central pin interface 162 can be non-removably fixed to or selectively removably coupled to the housing 112.

Additionally, in some implementations, the receptacle 104 includes one or more radio-frequency (RF) or magnetic field signal interference shields configured to block RF interference or noise. For example, the shields can prevent RF or magnetic field signal interference generated by the transmission of electrical power through the electrical pins from interfering with the electrical communication signals transmitted through the electrical contact pads 124. In one implementation, the RF or magnetic field signal interference shields are made of a Mu-metal.

Referring again to FIGS. 1-4, the plug 102 includes a housing 110 and circuit boards (not shown) extending from the housing 110. The circuit boards, which may be similar to the circuit boards 108, may include electrical traces imprinted on an electrically-insulating substrate. Moreover, in some implementations, the circuit boards can be flexible circuit boards. Each circuit board is electrically coupled to one or more electrical contacts of the plug 102 at one end and other electrical connections (not shown), such as those of a medical tool, device, or system, at an opposite end.

Figure 13:
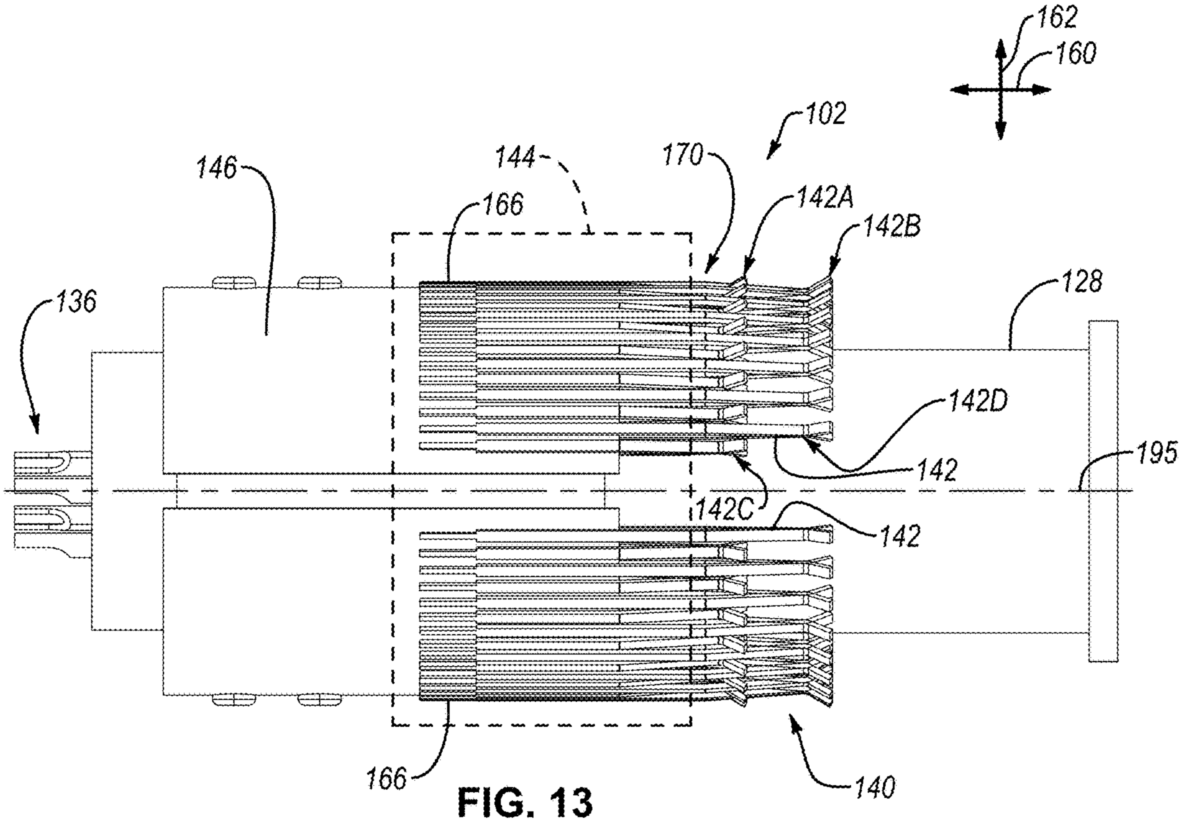
FIG. 13 is a side elevation view of a plug of the electrical connector of FIG. 1, shown with a housing and a contraflexure adjustment ring of the plug removed, according to one or more examples of the present disclosure.

The plug 102 further includes an electrical contact interface 140 that includes flexible electrical contacts 142 arranged in a set of annular patterns corresponding with a set of annular patterns of the electrical contact pads 124 forming the electrical contact-pad interface 123 of the annular FCB 120. Accordingly, the annular patterns of the flexible electrical contacts 142 are staggered relative to each other as described in more detail below. Referring to FIG. 13, the flexible electrical contacts 142 are fixed to opposing inner and outer surfaces of an annular FCB 146. The flexible electrical contact 142 includes an elongated arm that extends from a fixed end 166 of the elongated arm to a free end 170 or cantilevered end of the elongated arm. Each one of the flexible electrical contacts 142 is electrically coupled with an electrical trace of the annular FCB 146. The electrical traces facilitate the transmission of electrical signals between the flexible electrical contacts 142 and a corresponding one of circuit boards (not shown) coupled with or forming part of the annular FCB 146. In some examples, the annular FCB 146 includes a flexible substrate having multiple layers and the electrical traces are interposed between the layers. The flexible electrical contacts 142 (and the corresponding traces) are electrically isolated from each other such that each flexible electrical contact 142 facilitates a separate isolated connection. In one example, the annular FCB 146 is initially flat and flexed into an annular or circular shape during assembly of the plug 102. The flexible electrical contacts 142 can be attached to the annular FCB 146 when flat and form the annular patterns when the annular FCB 146 is flexed into the annular shape.

The housing 110 additionally includes a central engagement element 128 that is concentric with the central axis 195. The central engagement element 128 is located radially inwardly and spaced apart from the electrical contact interface 140. Moreover, the central engagement element 128 includes a central receptacle interface 136. The central receptacle interface 136 includes a plurality of spaced-apart electrical pin receptacles. The electrical pin receptacles are positioned within corresponding channels formed in the central receptacle interface 136. Although not shown, the electrical pin receptacles are electrically coupled to other electrical connections, such as those of a medical tool, commercial tool, or other device, at an opposite end. The central receptacle interface 136 can have any number of electrical pin receptacles. For example, the central receptacle interface 136 has eight electrical pin receptacles in some instances. However, in other examples, the central receptacle interface 136 can have fewer than eight electrical pin receptacles (e.g., one to seven electrical pin receptacles) or more than eight electrical pin receptacles (e.g., twelve, eighteen, thirty-two, or more electrical pin receptacles). The electrical pin receptacles are made of an electrically conductive material. In one implementation, the electrical pin receptacles are configured to transmit electrical power and the flexible electrical contacts 142 are configured to transmit electrical communication signals. The number and configuration of the electrical pin receptacles corresponds with that of the electrical pins 164 so that when the plug 102 is inserted into the receptacle 104, the electric pins 164 are inserted into and mate with the electrical pin receptacles to establish an electrical connection therebetween.

In some examples the central pin interface 162 includes tubular sleeves and each one of the electrical pins is partially enveloped by a corresponding one of the sleeves. The portions of the pins not enveloped by the sleeves extend from the sleeves and are electrically connected to the electrical pin receptacles of the central receptacle interface 136. The channels of the central receptacle interface 136 can be sized to receive (e.g., nestably receive) at least a portion of the sleeves so that both the sleeves and the pins extend into the channels of the central receptacle interface 136. The sleeves are made of an electrically non-conductive material, such as plastic. The sleeves of the central pin interface 162, being nestably received within the channels of the central receptacle interface 136, help to provide a longer insulation path when mated.

Although the central receptacle interface 136 in the illustrated embodiment facilitates electrical connections, in other embodiments, the central receptacle interface 136 may be modified to facilitate connections of other types, such as fiber optic, fluidic, pneumatic, and the like. Accordingly, in some implementations, the central receptacle interface 136 can be interchangeable or reconfigurable to meet any of various interconnect capabilities, such as those demanded by a customer. Furthermore, in some implementations, the central receptacle interface 136 can be non-removably fixed to or selectively removably coupled to the housing 110.

Additionally, in some implementations, the plug 102 includes one or more radio-frequency (RF) or magnetic field signal interference shields configured to block RF interference, magnetic field signals, and/or noise. For example, the shields can prevent RF interference or magnetic field signals generated by the transmission of electrical power through the electrical pins from interfering with the electrical communication signals transmitted through the flexible electrical contacts 142. In one implementation, the RF or magnetic field signal interference shields are made of a Mu-metal.

It is recognized that, in alternative examples, the plug 102 includes the electrical pins 164 and the receptacle 104 includes the electrical pin receptacles.

The plug 102 can be releasably connected to the receptacle 104 via a passive latch mechanism comprising retention tabs and recesses. However, in other examples, the plug 102 is releasably connected to the receptacle 104 via other coupling mechanisms, such as active latch mechanisms, friction latch mechanisms, and the like.

Referring to FIGS. 5-8 and 11, more details of the annular FCB 120 of the receptacle 104 are shown. The flexible substrate 122 of the annular FCB 120 has a thickness, which extends in a radial direction relative to the central axis 195, a width, which extends in a circumferential direction 163 perpendicular to the radial direction, and a length, which extends in an axial direction 160 (i.e., longitudinal direction) that is parallel to the central axis 195. The width is equal to the full or partial circumference of the circular shape defined by the flexible substrate 122. In some examples, the width of the flexible substrate 122 is less than the full circumference of the circular shape defined by the flexible substrate 122, such that a gap 129 is defined between opposing ends of the flexible substrate 122. However, in other examples, the width of the flexible substrate 122 is equal to the circumference of the circular shape defined by the flexible substrate 122, such that the opposing ends of the flexible substrate 122 are connected (e.g., adhered or soldered together) and no gap is present between the opposing ends. The flexible substrate 122 includes two opposing broad-faced surfaces. For example, the flexible substrate 122 has an outer surface 126 and an inner surface 131, which face opposite directions. The outer surface 126 faces away from the central axis 195 and the inner surface 131 faces towards the central axis 195. Both the outer surface 126 and the inner surface 131 are contoured or curved. The outer surface 126 has a convex contour and the inner surface 128 has a concave contour.

In some examples, the electrical contact pads 124 are formed on both the outer surface 126 and the inner surface 131 to maximize the number of electrical connections enabled by the electrical connector 100. Moreover, the electrical contact pads 124 of the electric contact-pad interface 123 are grouped into different annular pad patterns extending circumferentially along the width of the flexible substrate 122. Each one of the annular pad patterns includes an annular arrangement of electrical contact pads 124 spaced apart from each other in the circumferential direction 163 along the width of the flexible substrate 122. The electrical contact pads 124 of a given annular pad pattern are circumferentially aligned (i.e., located the same distance from the end of the engagement end portion 139 in the axial direction 160). However, in certain examples, the electrical contact pads 124 of a pad pattern on a given surface of the flexible substrate are longitudinally offset (e.g., spaced apart axially) from the electrical contact pads 124 of any other pad pattern on the given surface. In other words, no electrical contact pads 124 of one pad pattern on a given surface overlap with, in the circumferential direction 163, any of the electrical contact pads 124 of any other pad pattern on the given surface. Additionally, the electrical contact pads 124 of a given annular pad pattern have the same size and shape in some examples.

In the illustrated example, the electrical contact pads 124 are grouped into a first pad pattern 124A, a second pad pattern 124B, a third pad pattern 124C, and a fourth pad pattern 124D. The first pad pattern 124A and the second pad pattern 124B are formed on the outer surface 126. Similarly, the third pad pattern 124C and the fourth pad pattern 124D are formed on the inner surface 131. The electrical contact pads 124 of the first pad pattern 124A are situated closer to the end of the engagement end portion 139 than the second pad pattern 124B. Likewise, the electrical contact pads 124 of the third pad pattern 124C are situated closer to the end of the engagement end portion 139 than the fourth pad pattern 124D.

Adjacent pad patterns on a given surface of the flexible substrate 122 are staggered. More specifically, the electrical contact pads 124 of one pad pattern on a given surface of the flexible substrate 122 are staggered relative to the electrical contact pads 124 of an adjacent pad pattern on the given surface. As defined herein, a pad pattern on a given surface is staggered relative to an adjacent pad pattern on the given surface when each one of the electrical contact pads 124 of the pad pattern is not aligned with, in the longitudinal direction 160, any one of the electrical contact pads 124 of the adjacent pad pattern. Alignment of two electrical contact pads in a given direction means a center (i.e., a midpoint of the electrical contact pad in a direction perpendicular to the given direction) of one of the two electrical contact pads is in the same plane as a center of the other one of the two electrical contact pads, where the plane is parallel with the given direction. In one example of adjacent pad patterns that are staggered, each one of the electrical contact pads 124 of one pad pattern on a given surface is aligned, in the longitudinal direction 160, with a gap or space between a corresponding two electrical contact pads 124 of the other pad pattern.

Although two pad patterns on each side of the flexible substrate 122 are shown, it is recognized that in some examples, the receptacle 104 can have more than two pad patterns (e.g., three or more pad patterns) on the same side or both sides of the flexible substrate 122. In such examples, although adjacent ones of the pad patterns are staggered relative to each other, non-adjacent ones of the pad patterns may not be staggered relative to each other. For example, on a given side of the flexible substrate 122, the electrical contact pads 124 of a first pad pattern can be longitudinally aligned with the electrical contact pads 124 of a third pad pattern and not longitudinally aligned with the electrical contact pads 124 of a second pad pattern between the first and third pad patterns. In this example, the first and second pad patterns are staggered relative to each other and the second and third pad patterns are staggered relative to each other. Accordingly, the receptacle 104 is considered to have staggered pad patterns, even if some of the pad patterns are not staggered relative to each other, as long as directly adjacent ones of the pad patterns are staggered. In the case of a receptacle 104 having four pad patterns on the same side of the flexible substrate 122, the four pad patterns can be divided into two sets of staggered pad patterns where a pad pattern of one of the two sets may not be staggered relative to a pad pattern of the other of the two sets.

In the illustrated examples, the first pad pattern 124A is staggered relative to the second pad pattern 124B (collective forming a set of patterns), and the third pad pattern 124C is staggered relative to the fourth pad pattern 124D (collectively forming a set of patterns). In conjunction with the above descriptions, this means the electrical contact pads 124 of the first pad pattern 124A are longitudinally offset relative to the electrical contact pads 124 of the second pad pattern 124B, and no one of the electrical contact pads 124 of the first pad pattern 124A is aligned with, in the longitudinal direction 160, any one of the electrical contact pads 124 of the second pad pattern 124B. Similarly, the above description means the electrical contact pads 124 of the third pad pattern 124C are longitudinally offset relative to the electrical contact pads 124 of the fourth pad pattern 124D, and no one of the electrical contact pads 124 of the third pad pattern 124C is aligned with, in the longitudinal direction 160, any one of the electrical contact pads 124 of the fourth pad pattern 124D.

Figure 7:
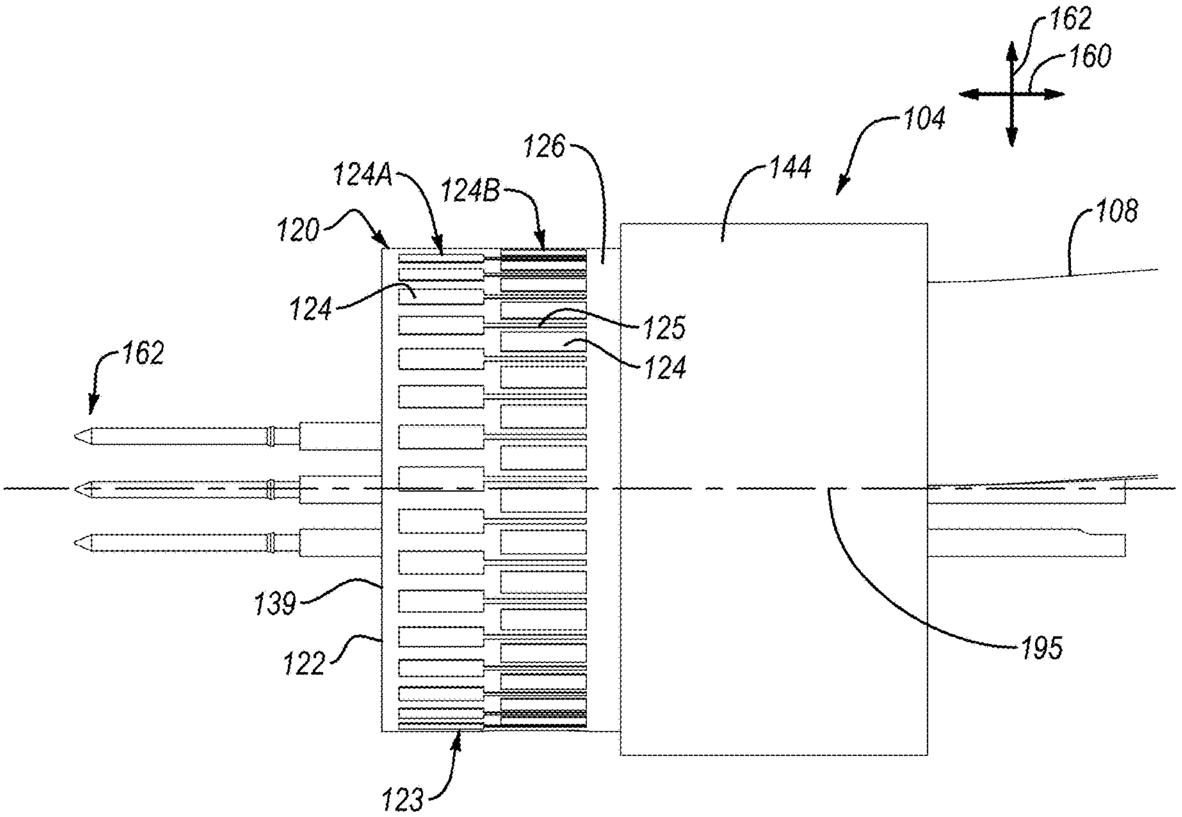
FIG. 7 is a side elevation view of a receptacle of the electrical connector of FIG. 1, shown with a housing of the receptacle removed, according to one or more examples of the present disclosure.
Figure 8:
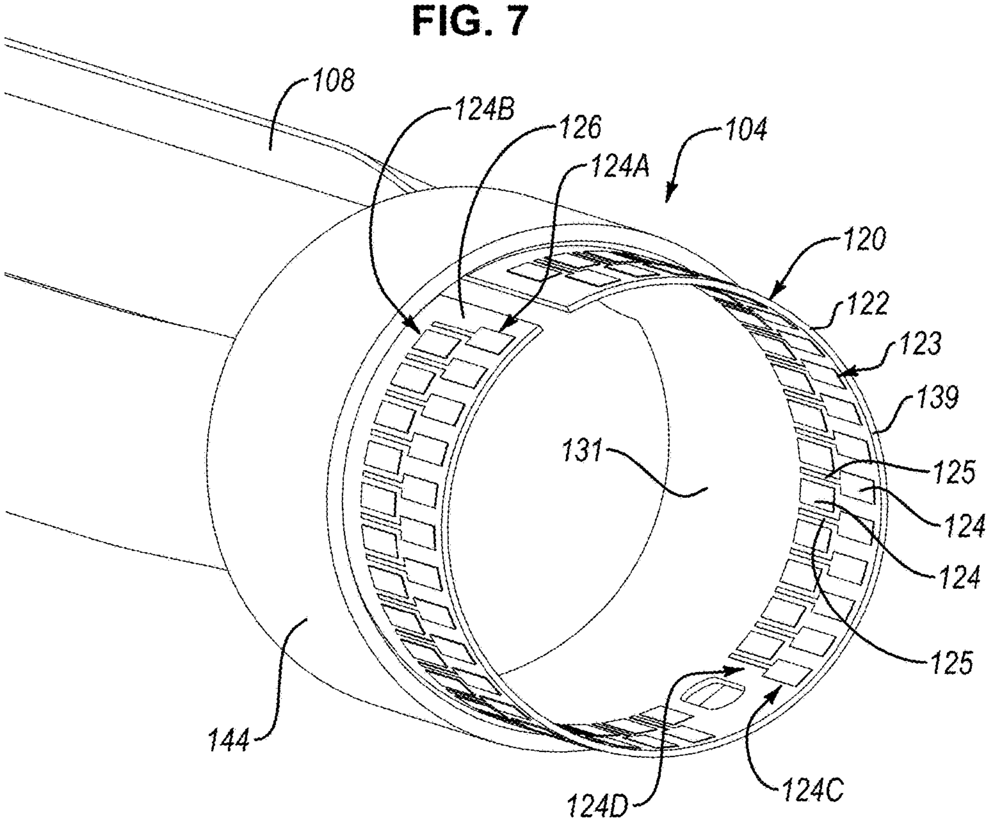
FIG. 8 is a perspective view of the receptacle of the electrical connector of FIG. 1, shown with the housing of the receptacle removed, according to one or more examples of the present disclosure.
Figure 9:
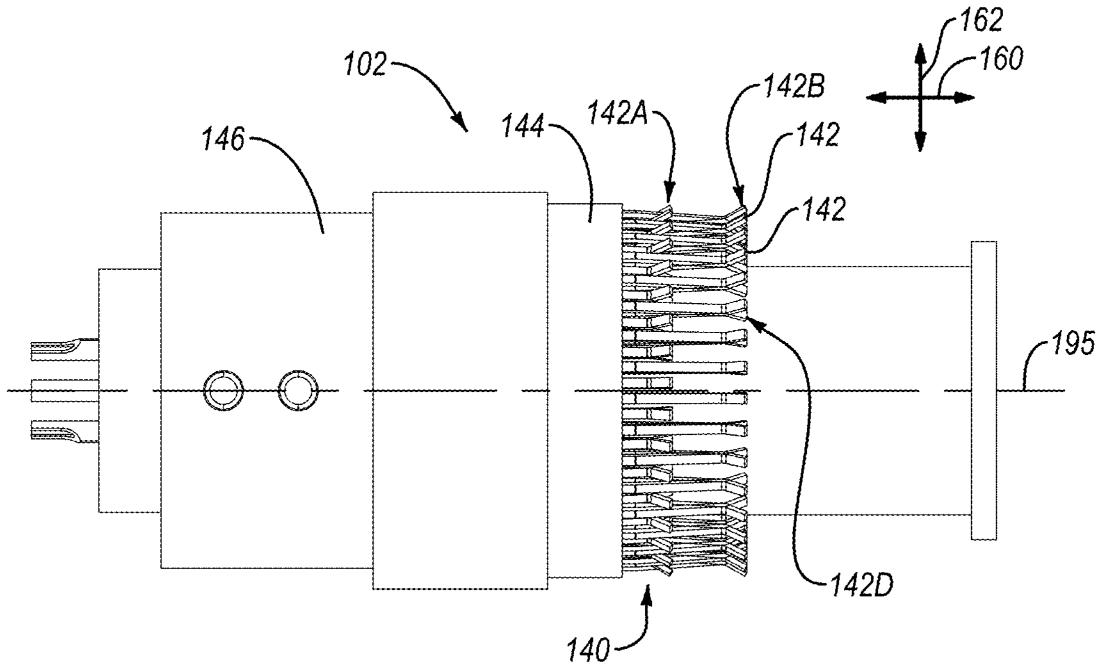
FIG. 9 is a side elevation view of a plug of the electrical connector of FIG. 1, shown with a housing of the plug removed, according to one or more examples of the present disclosure.
Figure 10:
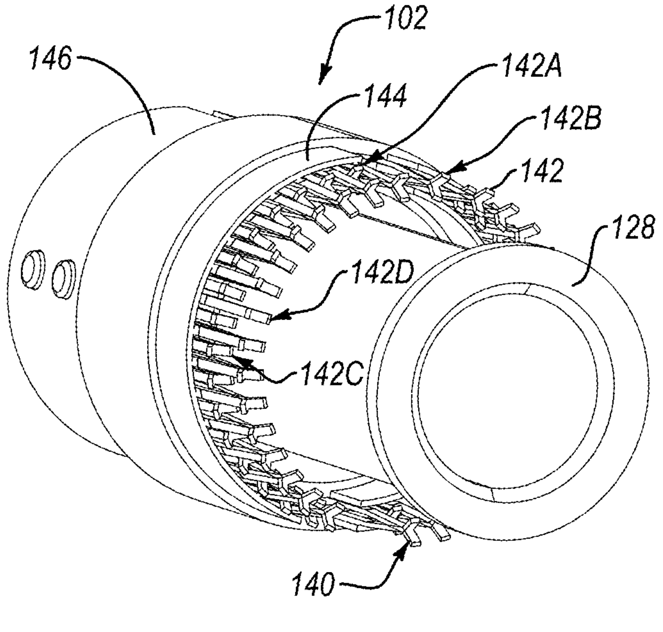
FIG. 10 is a perspective view of the plug of the electrical connector of FIG. 1, shown with the housing of the plug removed, according to one or more examples of the present disclosure.
Figure 11:
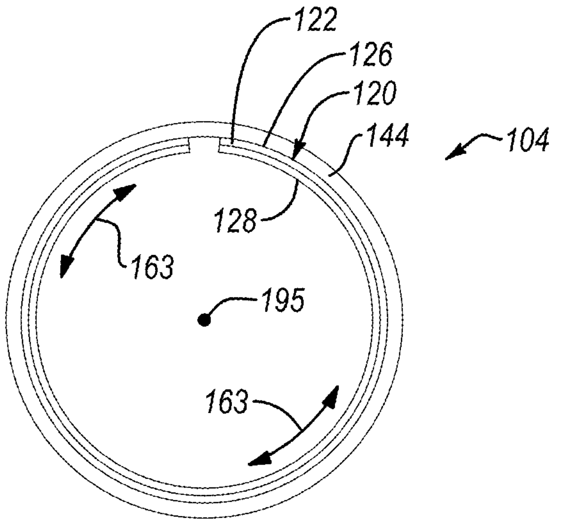
FIG. 11 is a front elevation view of a receptacle of the electrical connector of FIG. 1, shown with a housing of the receptacle removed, according to one or more examples of the present disclosure.
Figure 12:
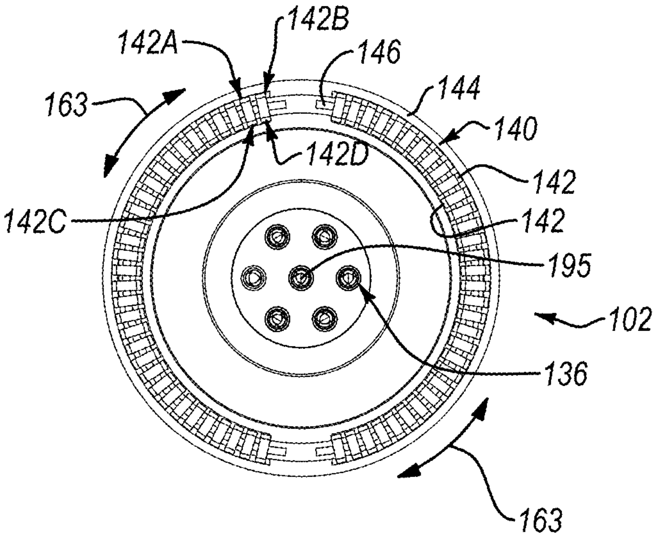
FIG. 12 is a front elevation view of a plug of the electrical connector of FIG. 1, shown with a housing of the plug removed, according to one or more examples of the present disclosure.

In certain examples, such as shown, the electrical contact pads 124 of one of the pad patterns on a given surface are electrically coupled with an electrical trace 125 that is formed on the given surface and longitudinally (e.g., parallel with the central axis 195) extend through the gaps between adjacent ones of the electrical contact pads 124 of the adjacent one of the pad patterns on the given surface. For example, as shown in FIG. 7, each one of the electrical contact pads 124 of the first pad pattern 124A is electrically coupled with a surface-mounted electrical trace 125 that extends longitudinally along the outer surface 126 between two of the electrical contact pads 124 of the second pad pattern 124B. As shown in FIG. 8, the electrical contact pads 124 of the third pad pattern 124C are coupled with electrical traces 125 in the same manner as the first pad pattern 124A.

Referring to FIGS. 5, 6, 9, 10, 12, and 13, more details of the electrical contact interface 140 of the plug 102 are shown. The annular FCB 146 of the plug 102 has an outer surface and an inner surface, which face opposite directions. The outer surface faces away from the central axis 195 and the inner surface faces towards the central axis 195. Both the outer surface and the inner surface of the annular FCB 146 are contoured or curved, such that the outer surface has a convex contour and the inner surface has a concave contour. In some examples, the flexible electrical contacts 142 of the electrical contact interface 140 are attached to both the outer surface and the inner surface of the annular FCB 146 to maximize the number of electrical connections enabled by the electrical connector 100. Moreover, the flexible electrical contacts 142 are grouped into different annular contact patterns extending circumferentially along the width of the annular FCB 146.

Each one of the annular contact patterns includes an annular arrangement of electrical contact points 187 (see, e.g., FIG. 16) of the flexible electrical contacts 142, which are spaced apart from each other in the circumferential direction 163 so that a gap is defined between the flexible electrical contacts 142 defining a given annular contact pattern. In examples that have two annular contact patterns on a given side of the annular FCB 146, such as shown, the flexible electrical contacts 142 defining one of the two annular contact patterns are positioned in the gaps defined between the flexible electrical contacts 142 defining the other one of the two annular contact patterns. In other words, on a given side of the annular FCB 146, the flexible electrical contacts 142 defining one of the two annular contact patterns on that side are interposed between the flexible electrical contacts 142 defining the other one of the two annular contact patterns on the same side. The size of the gaps are such that the flexible electrical contacts 142 defining one of the two annular contact patterns are electrically isolated from the flexible electrical contacts 142 defining the other one of the two annular contact patterns on the same side.

The electrical contact points 187 of a given annular pad pattern are circumferentially aligned (i.e., located the same distance from the end 147 of the annular FCB 146). However, in certain examples, the electrical contact points 187 of the flexible electrical contacts 142 of a contact pattern on a given side of the annular FCB 146 are longitudinally offset from the electrical contact points 187 of the flexible electrical contacts 142 of any other contact pattern on the given side. In other words, no electrical contact points 187 of one contact pattern on a given side overlap with, in the circumferential direction 163, any of the electrical contact points 187 of any other contact pattern on the given side.

In the illustrated example, the flexible electrical contacts 142 are grouped into a first contact pattern 142A, a second contact pattern 142B, a third contact pattern 142C, and a fourth contact pattern 142D. The first contact pattern 142A and the second contact pattern 142B are attached to the outer surface of the annular FCB 146. Similarly, the third contact pattern 142C and the fourth contact pattern 142D are formed on the inner surface of the annular FCB 146. The electrical contact points 187 of the first contact pattern 142A are situated closer to the end 147 of the annular FCB 146 than the electrical contact points 187 of the second contact pattern 142B. Likewise, the electrical contact points 187 of the third contact pattern 142C are situated closer to the end 147 of the annular FCB 146 than the fourth contact pattern 142D.

The contact patterns of the flexible electrical contacts 142 on a given surface of the annular FCB 146 are staggered. More specifically, the electrical contact points 187 of one contact pattern on a given surface of the annular FCB 146 are staggered relative to the electrical contact points 187 of an adjacent contact pattern on the given surface. As defined herein, a contact pattern of flexible electrical contacts 142 on a given surface is staggered relative to an adjacent contact pattern of flexible electrical contacts 142 on the given surface when the electrical contact points 187 of all the flexible electrical contacts 142 of the contact pattern are not aligned with, in the circumferential direction 163, any one of the electrical contact points 187 of the adjacent contact pattern. Alignment of two electrical contact points in the circumferential direction 163 means a center (i.e., a midpoint of the electrical contact pad in a direction perpendicular to the circumferential direction 163) of one of the two electrical contact points is in the same plane as a center of the other one of the two electrical contact points, where the plane is parallel with the circumferential direction 163.

Although two contact patterns are shown on each side of the annular FCB 146, it is recognized that in some examples, the plug 102 can have more than two contact patterns (e.g., three or more contact patterns) on the same side or both sides of the annular FCB 146. In such examples, although adjacent ones of the contact patterns are staggered relative to each other, non-adjacent ones of the contact patterns may not be staggered relative to each other. For example, on a given side of the annular FCB 146, the electrical contact points 187 of a first contact pattern can be longitudinally aligned with the electrical contact points 187 of a third contact pattern and not longitudinally aligned with the electrical contact points 187 of a second contact pattern between the first and third contact patterns. In this example, the first and second contact patterns are staggered relative to each other and the second and third contact patterns are staggered relative to each other. Accordingly, the plug 102 is considered to have staggered contact patterns, even if some of the contact patterns are not staggered relative to each other, as long as directly adjacent ones of the contact patterns are staggered. In the case of a plug 102 having four contact patterns on the same side of the annular FCB 146, the four contact patterns can be divided into two sets of staggered contact patterns where a contact pattern of one of the two sets may not be staggered relative to a contact pattern of the other of the two sets.

In the illustrated examples, the first contact pattern 142A is staggered relative to the second contact pattern 142B (collectively forming a set of patterns), and the third contact pattern 142C is staggered relative to the fourth contact pattern 142D (collectively forming a set of patterns). This means the electrical contact points 187 of the first contact pattern 142A are longitudinally offset relative to the electrical contact points 187 of the second contact pattern 142B, and the electrical contact points 187 of the third contact pattern 142C are longitudinally offset relative to the electrical contact points 187 of the fourth contact pattern 142D.

Generally, the electrical contact points 187 are proximate a cantilevered end of the flexible electrical contacts 142. Accordingly, the flexible electrical contacts 142 defining the first contact pattern 142A are shorter than the flexible electrical contacts 142 defining the second contact pattern 142B. Likewise, the flexible electrical contacts 142 defining the third contact pattern 142C are shorter than the flexible electrical contacts 142 defining the fourth contact pattern 142D.

Figure 14:
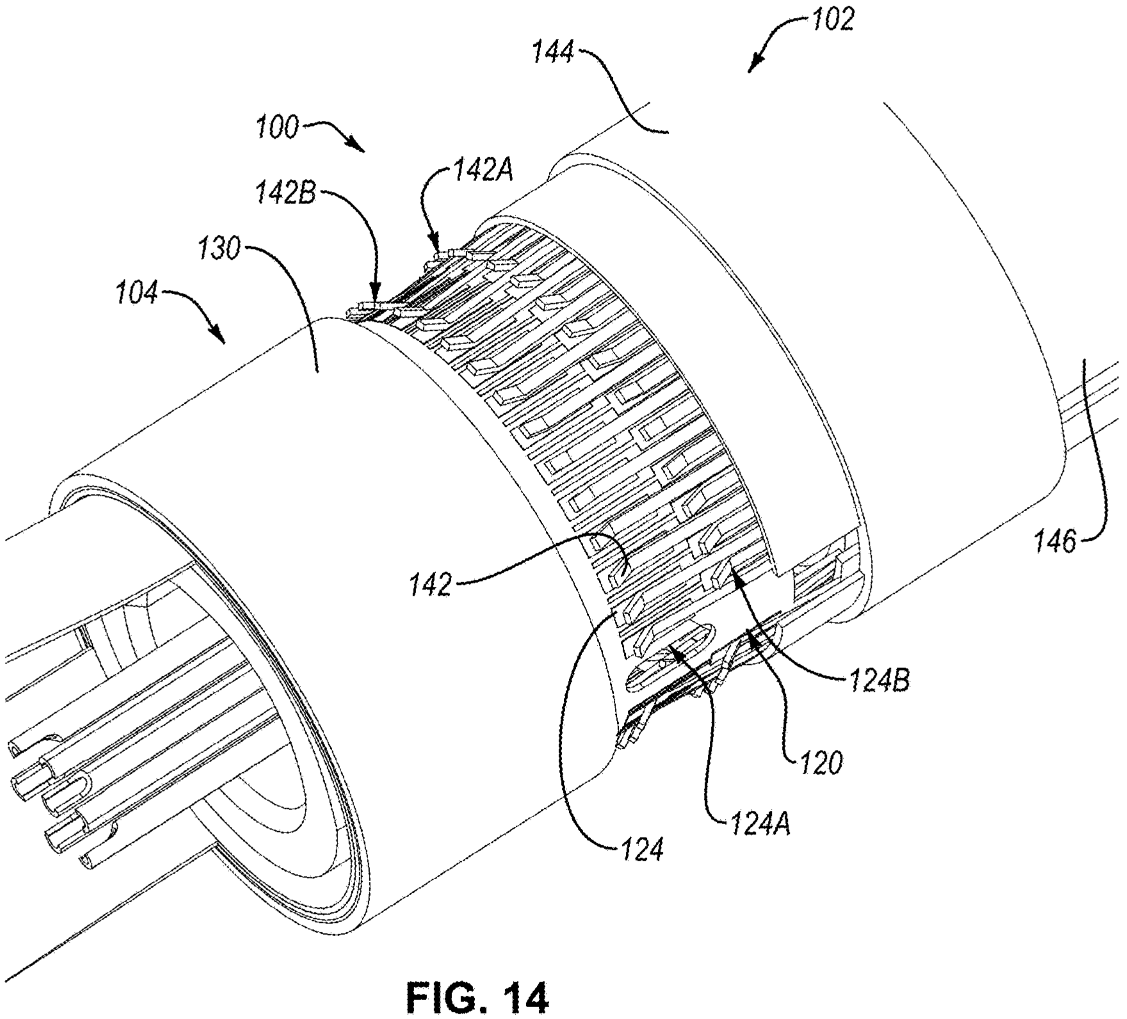
FIG. 14 is a perspective view of the electrical connector of FIG. 1, shown with housings of a plug and a receptacle of the electrical connector removed, according to one or more examples of the present disclosure.
Figure 15:
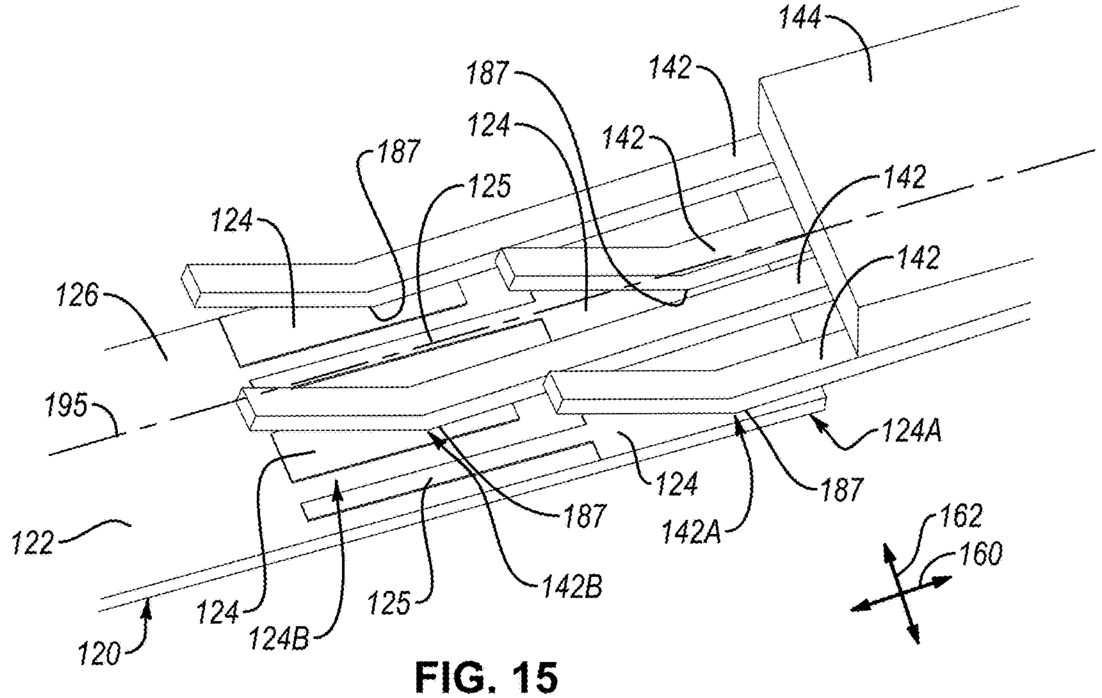
FIG. 15 is a perspective view of a section of a contact-pad engagement portion of the electrical connector of FIG. 1, according to one or more examples of the present disclosure.
Figure 16:
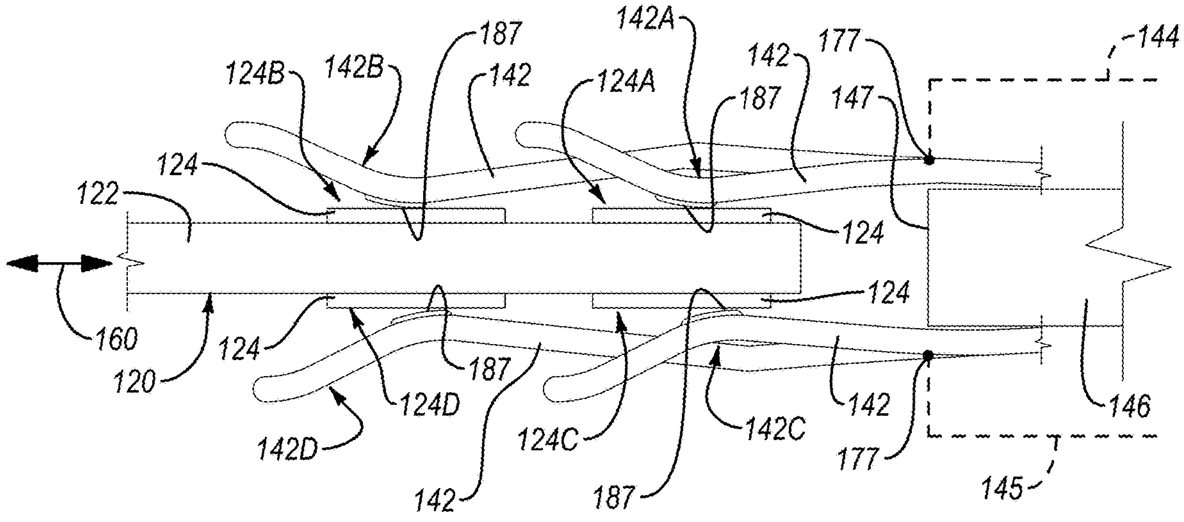
FIG. 16 is a side elevation view of a section of a contact-pad engagement portion of the electrical connector of FIG. 1, according to one or more examples of the present disclosure.

Referring to FIGS. 14-16, with the central axis 195 of the plug 102 aligned with the central axis 195 of the receptacle 104, the plug 102 can be inserted into the receptacle 104. As the plug 102 is inserted into the receptacle 104, the flexible electrical contacts 142 engage the electrical contact pads 124 and establish an electrical connection with the electrical contact pads 124. Engagement includes radial flexing (i.e., flexing in a radial direction) of the flexible electrical contacts 142 and sliding of the electrical contact points 187 along the flexible substrate 122 until the electrical contact points 187 come into contact with corresponding ones of the electrical contact pads 124. To facilitate initial engagement with the flexible substrate 122 and initial radial flexing of the flexible electrical contacts 142, the cantilevered ends of the flexible electrical contacts 142 can be angled, beveled, or sloped. In some examples, the plug 102 includes separator prongs that extend between circumferentially adjacent flexible electrical contacts 142. The separator prongs are more rigid than the flexible electrical contacts 142. Accordingly, the separator prongs help to maintain separation between circumferentially adjacent flexible electrical contacts 142, and help to prevent radially adjacent flexible electrical contacts 142 from scissoring relative to each other.

Figure 4:
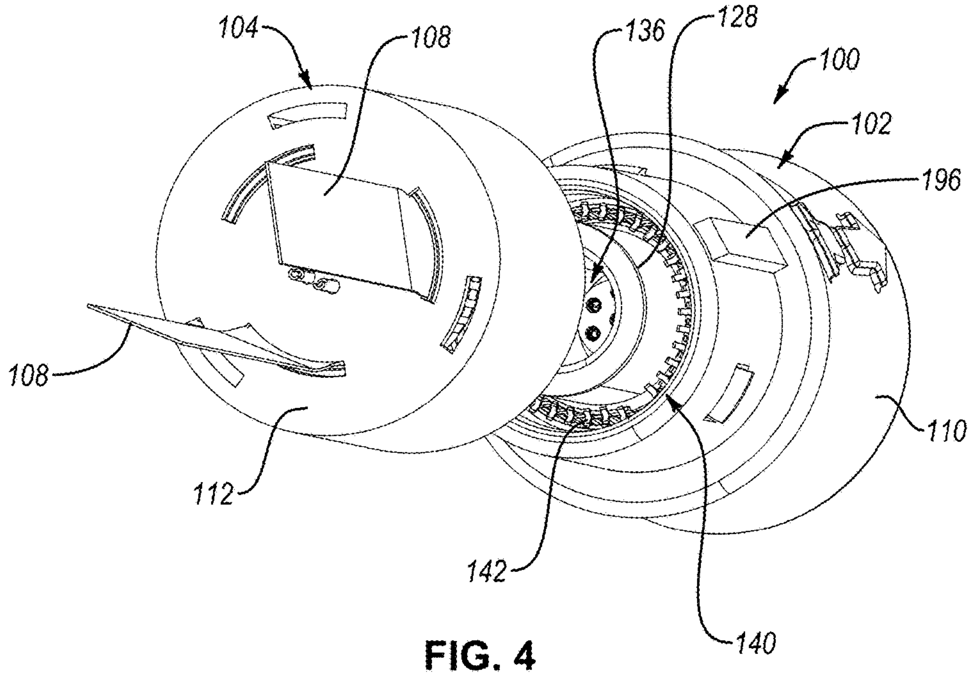
FIG. 4 is a perspective view of the electrical connector of FIG. 1, showing the plug and the receptacle separated and shown from receptacle side of the electrical connector, according to one or more examples of the present disclosure.
Figure 5:
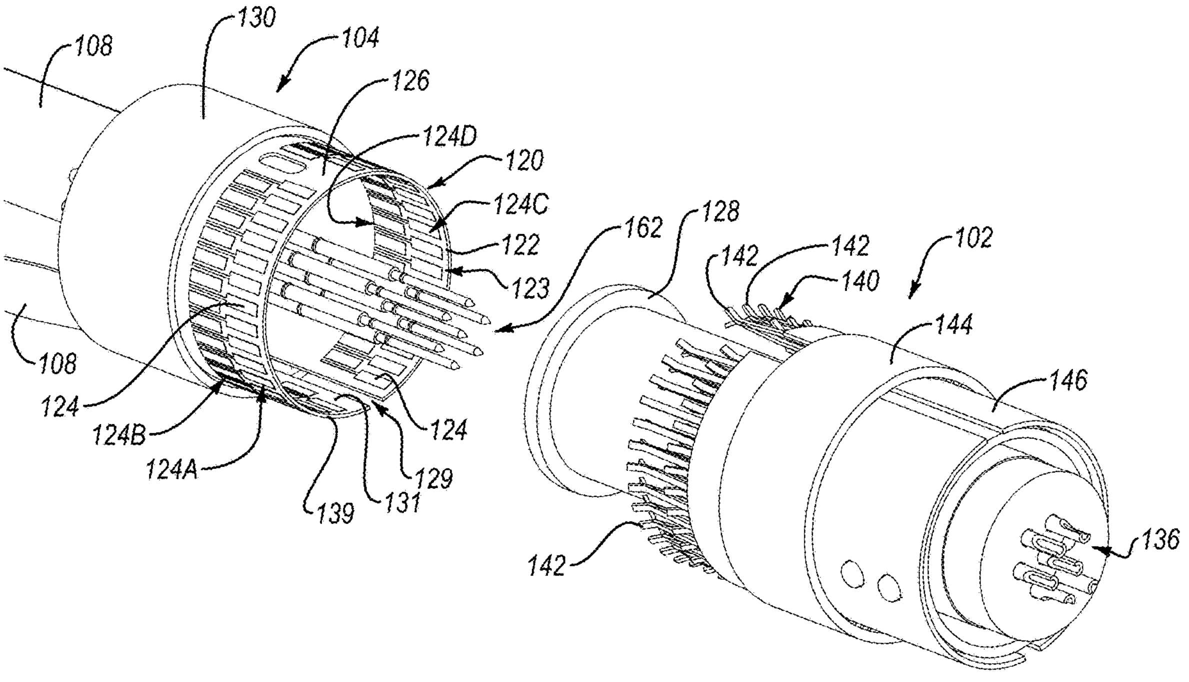
FIG. 5 is a perspective view of the electrical connector of FIG. 1, showing the plug and the receptacle separated and shown from a plug side of the electrical connector and shown with housings removed, according to one or more examples of the present disclosure.
Figure 6:
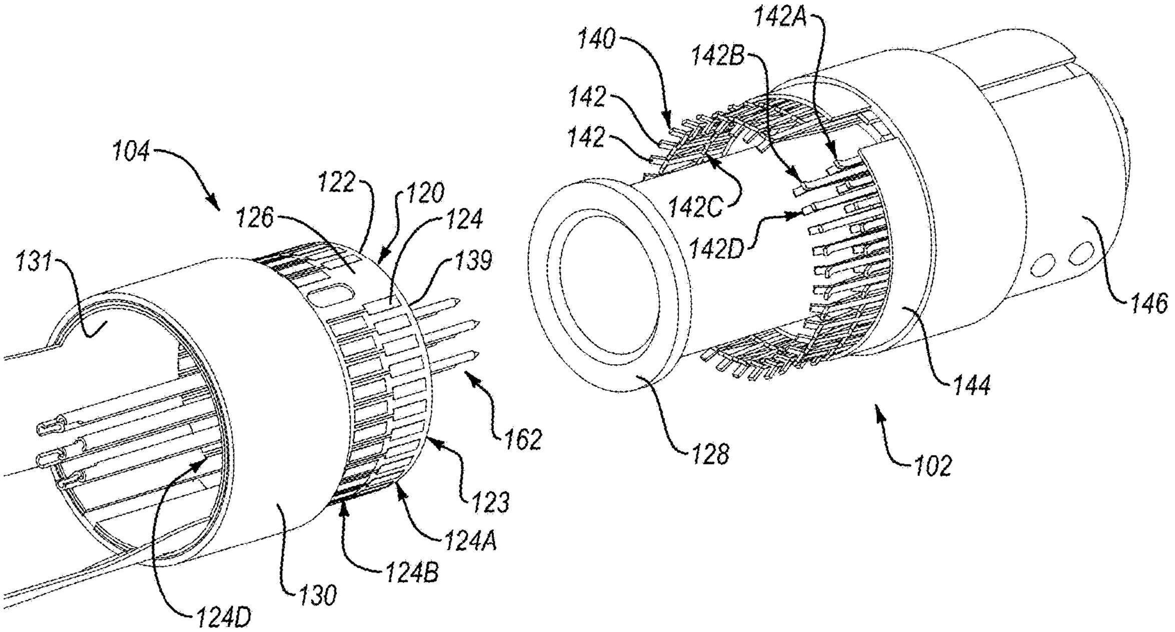
FIG. 6 is a perspective view of the electrical connector of FIG. 1, showing the plug and the receptacle separated, shown from receptacle side of the electrical connector and shown with housings removed, according to one or more examples of the present disclosure.

To promote rotational alignment of the plug 102 and the receptacle 104 relative to each other, in some examples, as shown in FIG. 4, the plug 102 and the receptacle 104 can include keying features that, when engaged, ensure proper rotational alignment of the plug 102 and the receptacle 104. For example, the housing 110 of the plug 102 can include a first keying feature 196 and the housing 112 of the receptacle 104 can include a second keying feature 198. In order for full insertion of the plug 102 into the receptacle 104, the first keying feature 196 must be engaged with the second keying feature 198. In the illustrated example, the first keying feature 196 is a rib or tab, and the second keying feature 198 is a slot or channel within which the rib or tab is slidable. However, it is recognized that in other examples, the first keying feature 196 is a slot or channel, and the second keying feature 198 is a rib or tab. Additionally, or alternatively, first and second keying features could be integrated into the annular tube 189 of the housing 112 and the central engagement element 128 of the housing 110, respectively.

In the illustrated examples, the flexible electrical contacts 142 of the first contact pattern 142A flex radially outwardly away from the central axis 195 so that the electrical contact point 187 of each one of the flexible electrical contacts 142 of the first contact pattern 142A makes electrical contact with a corresponding one of the electrical contact pads 124 of the first pad pattern 124A. Similarly, the flexible electrical contacts 142 of the second contact pattern 142B flex radially outwardly away from the central axis 195 so that the electrical contact point 187 of each one of the flexible electrical contacts 142 of the second contact pattern 142B makes electrical contact with a corresponding one of the electrical contact pads 124 of the second pad pattern 124B. In contrast to the foregoing, the flexible electrical contacts 142 of the third contact pattern 142C flex radially inwardly toward the central axis 195 so that the electrical contact point 187 of each one of the flexible electrical contacts 142 of the third contact pattern 142C makes electrical contact with a corresponding one of the electrical contact pads 124 of the third pad pattern 124C. Likewise, the flexible electrical contacts 142 of the fourth contact pattern 142D flex radially inwardly toward the central axis 195 so that the electrical contact point 187 of each one of the flexible electrical contacts 142 of the fourth contact pattern 142D makes electrical contact with a corresponding one of the electrical contact pads 124 of the fourth pad pattern 124D.

The flexible electrical contacts 142 radially flexes about a contraflexure point. The further the distance from an electrical contact point 187 and the contraflexure point the smaller the force applied by the electrical contact point 187 to an electrical contact pad 124, and thus the weaker the electrical contact between the electrical contact point 187 and the electrical contact pad 124. To improve the electrical contact, the contraflexure point can be moved closer to the electrical contact point 187. In some examples, and with reference to FIGS. 13 and 14, the plug 102 includes a contraflexure adjustment ring 144 that encircles the flexible electrical contacts 142 of the first contact pattern 142A and the second contact pattern 142B and sets a contraflexure point 177 (see, e.g., FIG. 16) that is closer to the electrical contact points 187, compared to without the contraflexure adjustment ring 144 when the contraflexure point would be near the attachment point of the flexible electrical contacts 142 to the annular FCB 146. The plug 102 further includes a second contraflexure adjustment ring 145 located radially inwardly of the contraflexure adjustment ring 144 so that the annular FCB 146 is between the contraflexure adjustment rings. The second contraflexure adjustment ring 145 extends along the flexible electrical contacts 142 of the third contact pattern 142C and the fourth contact pattern 142D and sets a contraflexure point 177 that is closer to the electrical contact points 187.

The electrical contact pads 124 and the flexible electrical contacts 142 are made of an electrically conductive material, such as metal (e.g., copper, phosphorus-bronze, beryllium-copper, or other electrically conductive spring alloys). In some examples, the flexible electrical contacts 142 are made using a metal stamping process. For example, each flexible electrical contact 142 can be formed by stamping without a subsequent bending of the flexible electrical contact 142. In other words, no portion of the flexible electrical contact 142 is elastically deformed. Because bending of the flexible electrical contact 142 is not necessary, each one of the flexible electrical contacts 142 can be smaller and formed at a lower cost, with a more fine-tuned moment of inertia, and with more controlled tolerances compared to stamped and bent electrical contacts.

Although the illustrated examples of the electrical connector 100 include staggered electrical contact pads 124 on outer and inner surfaces of an annular FCB of a receptacle and staggered flexible electrical contacts 142 on outer and inner surfaces of an annular FCB of a plug, it is recognized in other examples, only one of the outer and inner surfaces of the annular FCB of the receptacle includes staggered electrical contact pads and only one of the outer and inner surfaces of the annular FCB of the plug includes staggered flexible electrical contacts. Additionally, it is recognized that in some embodiments the electrical connection features of the electrical connector 100 can be reversed without departing from the essence of the present disclosure. For example, the receptacle can include staggered flexible electrical contacts and the plug can include staggered electrical contact pads.

Figure 17:
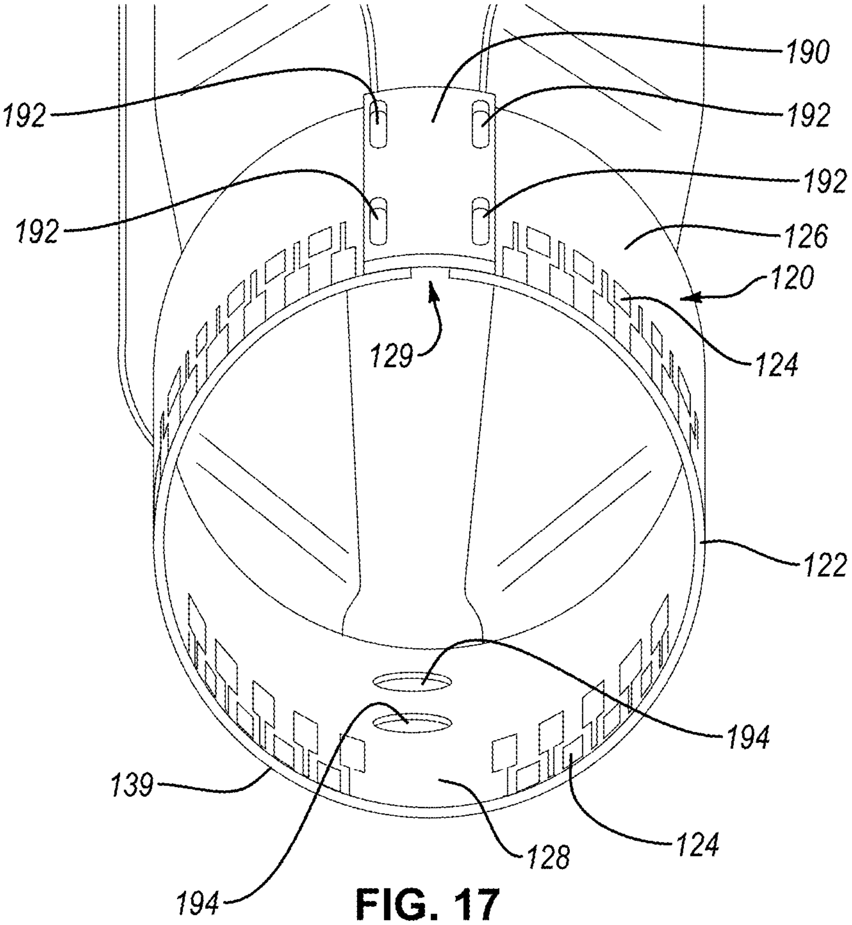
FIG. 17 is a perspective view of an annular flexible circuit board of a receptacle of the electrical connector of FIG. 1, according to one or more examples of the present disclosure.

Referring to FIG. 17, in some examples, the receptacle 104 includes a FCB retention bracket 190 that is coupled to the annular FCB 120 and spans the gap 129 between opposing ends of the annular FCB 120. The FCB retention bracket 190 helps to fix the position of the opposing ends relative to each other, and thus improves the hoop strength of the annular FCB 120 and maintains the circular shape of the annular FCB 120 around a mandrel portion or cylindrical mounting portion of the housing 112. The FCB retention bracket 190 has a curvature similar to the curvature of the annular FCB 120. In certain examples, the FCB retention bracket 190 is made of a material different than the flexible substrate 122 of the annular FCB 120. For example, the substrate 122 can be made of a non-metal and the FCB retention bracket 190 can be made of a metal. According to some examples, the FCB retention bracket 190 is adhered to, soldered to, or welded to the annular FCB 120. The annular FCB 120 can include solder pads 192 at location near the opposing ends of the annular FCB 120, which facilitate the soldering of the FCB retention bracket 190 to the annular FCB 120. In the illustrated example, the annular FCB 120 includes two solder pads 192, spaced apart along one of the opposing edges, and two solder pads 192, spaced apart along the other one of the opposing edges. To help strengthen the solder pads 192, and the overall coupling between the FCB retention bracket 190 and the annular FCB 120, the solder pads 192 can include via portions that extend through a thickness of the flexible substrate 122 of the annular FCB 120.

Figure 18:
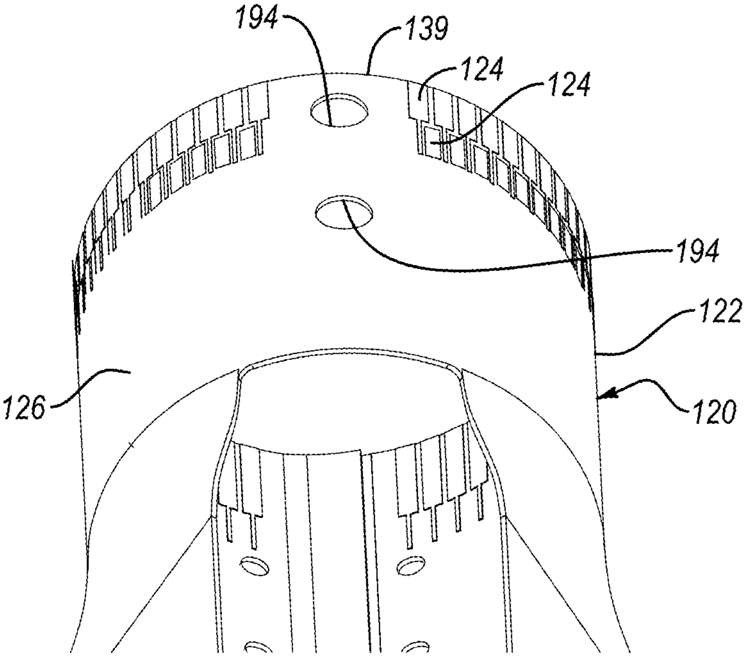
FIG. 18 is another perspective view of the annular flexible circuit board of the receptacle of the electrical connector of FIG. 1, according to one or more examples of the present disclosure.
Figure 19:
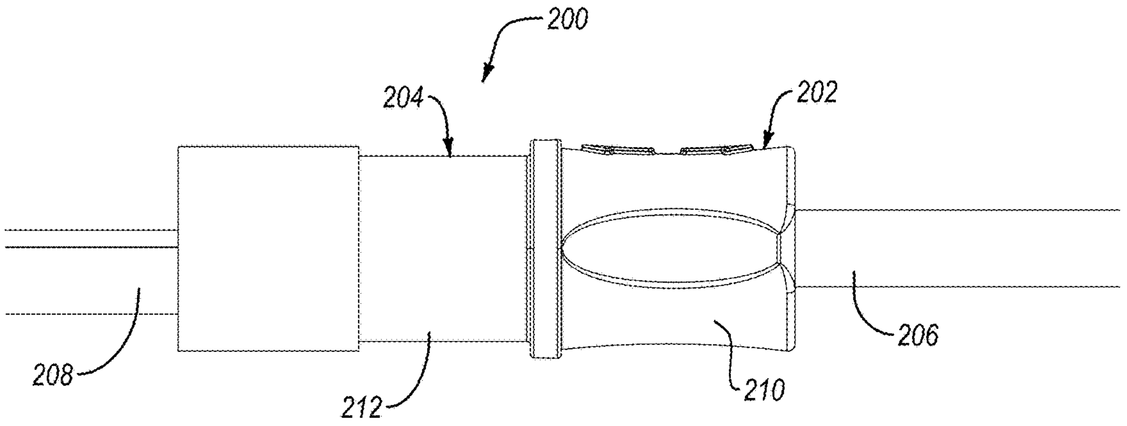
FIG. 19 is a side elevation view of an electrical connector, according to one or more examples of the present disclosure.

As shown in FIG. 18, in certain examples, the annular FCB 120 includes registration features, such as registration apertures 194, located further away from the edge of the engagement end portion 139 than the electrical contact pads 124. The housing 112 includes corresponding registration features, such as tabs or protrusions, that engage the registration features of the annular FCB 120. Engagement between the registration features of the annular FCB 120 and the housing 112 maintains the shape of the annular FCB 120 away from the engagement end portion 139, which helps to prevent buckling of annular FCB 120 away from the engagement end portion 139.

In the above examples of the electrical connector 100, the electrical contact pads 124 of the flexible substrate 122 are staggered. However, in alternative examples, as described below, an electrical connector 200, similar to the electrical connector 100, includes a flexible substrate 222 where electrical contact pads 224 of the flexible substrate 222 are not staggered.

Referring to FIGS. 19-22, one example of the electrical connector 200 includes a plug 202 and a receptacle 204. Like the electrical connector 100, the electrical connector 200 is considered a high-density electrical connector. Again, like the electrical connector 100, the majority of the electrical contacts of the electrical connector 200 are arranged circumferentially or annularly about a common axis (e.g., central axis 295 of FIGS. 9, 11-13, and 15). Accordingly, like the electrical connector 100, coaxial and rotational alignment of the plug 202 and the receptacle 204 is based on initial alignment of a single, predictable primary datum independent of the electrical contacts.

The receptacle 204 includes a housing 212 and circuit boards 208 extending from the housing 212. The circuit boards 208 may include electrical traces imprinted on an electrically-insulating substrate. Moreover, in some implementations, the circuit boards 208 can be flexible circuit boards. Each circuit board 206 is electrically coupled to one or more electrical contacts of the receptacle 204 at one end and other electrical connections (not shown), such as those of a medical tool, device, or system, at an opposite end.

The receptacle 204 further includes an annular FCB 220 housed within an interior cavity of the housing 212. The receptacle 204 further includes a frame 289 within and retained by the housing 212. Although shown as two pieces, in some examples, the frame 289 and the housing 212 can be co-formed together. The frame 289, which includes a central annular tube, is configured to retain the annular FCB 220 so that the annular FCB 220 does not move relative to the housing 212 and so that an engagement end portion 239 of the annular FCB 220 (see, e.g., FIGS. 21 and 32-34) is suspended within the interior cavity of the housing 212, as defined above. Suspending the engagement end portion 239 within the housing 212 enables flexible electrical contacts 242 of the plug 102 to engage the electrical contact pads 224 from both sides of the annular FCB 220.

Figure 23:
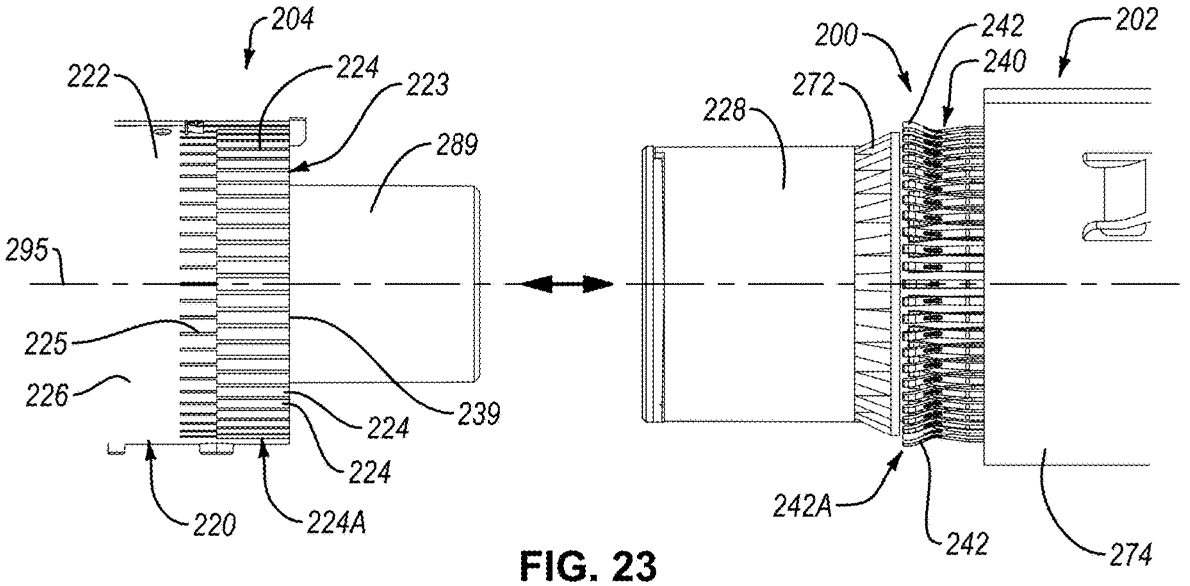
FIG. 23 is a side elevation view of the electrical connector of FIG. 19, showing the plug and the receptacle separated and shown with housings of the plug and receptacle removed, according to one or more examples of the present disclosure.
Figure 24:
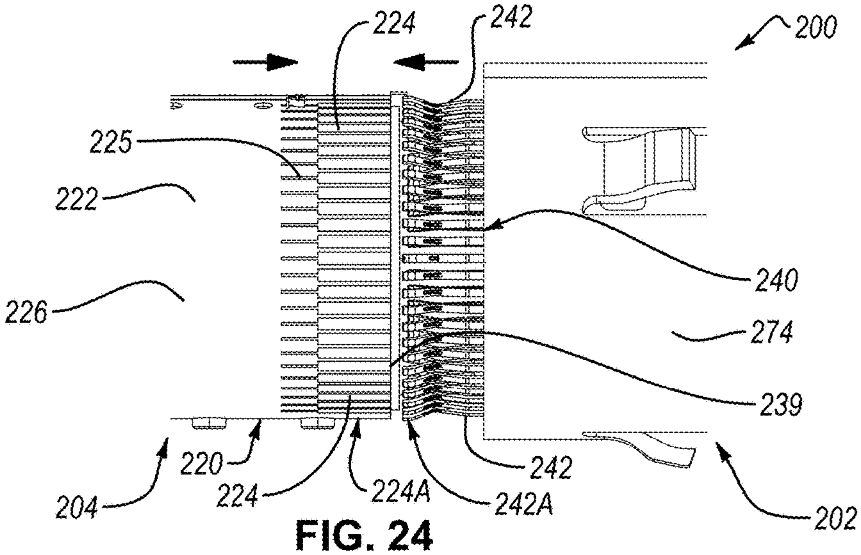
FIG. 24 is a side elevation view of the electrical connector of FIG. 19, showing the plug and the receptacle coming into engagement and shown with housings of the plug and receptacle removed, according to one or more examples of the present disclosure.
Figure 25:
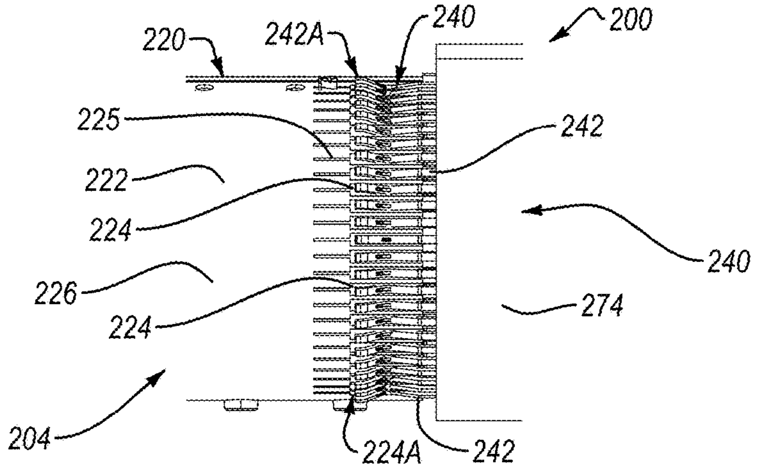
FIG. 25 is a side elevation view of the electrical connector of FIG. 19, showing the plug and the receptacle engaged and shown with housings of the plug and receptacle removed, according to one or more examples of the present disclosure.
Figure 26:
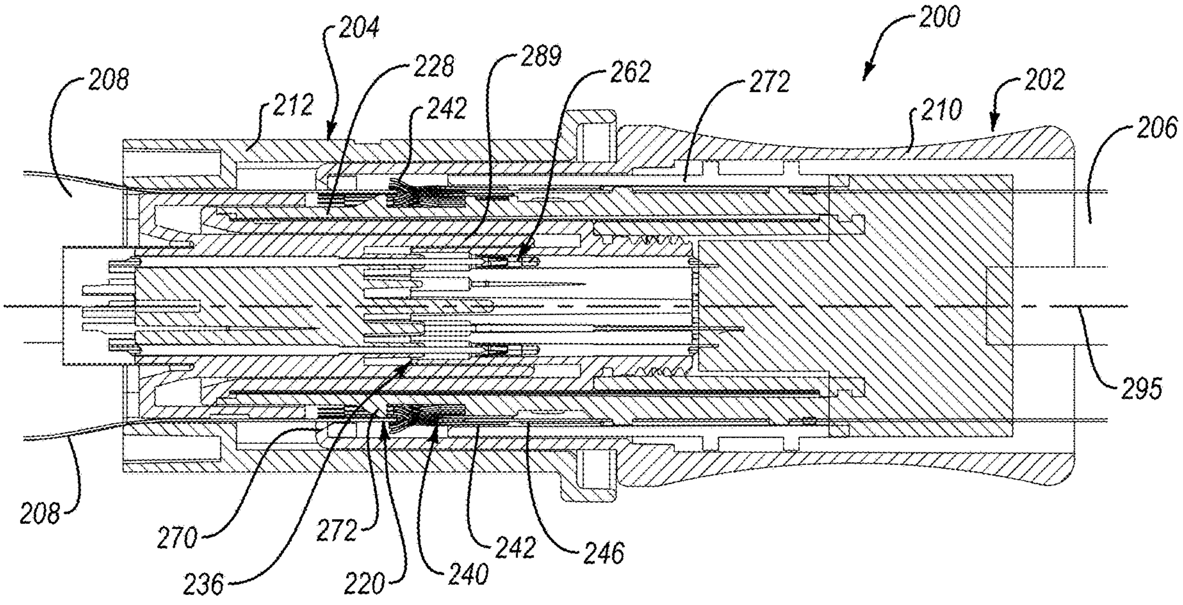
FIG. 26 is a side elevation cross-sectional view of the electrical connector of FIG. 19, taken along a plane within which a central axis of the electrical connector lies and showing the plug and the receptacle engaged, according to one or more examples of the present disclosure.
Figure 27:
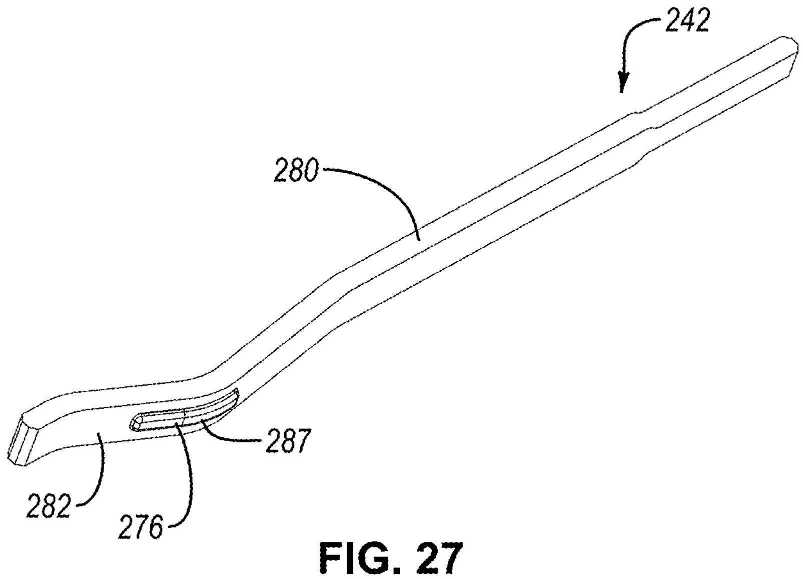
FIG. 27 is a first perspective view of a flexible electrical contact of the electrical connector of FIG. 19, according to one or more examples of the present disclosure.
Figure 28:
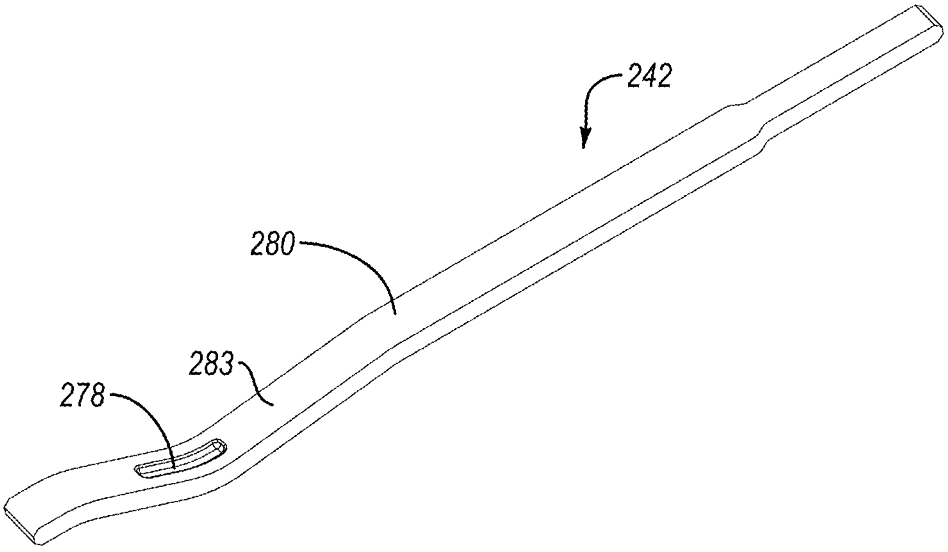
FIG. 28 is a second perspective view of the flexible electrical contact of FIG. 27, according to one or more examples of the present disclosure.
Figure 29:
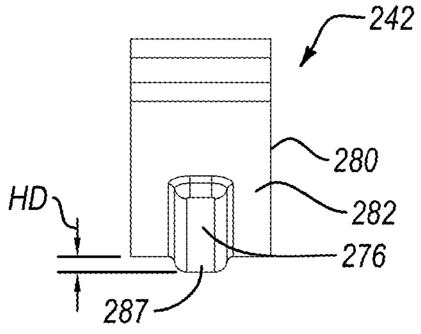
FIG. 29 is a front view of the flexible electrical contact of FIG. 27, according to one or more examples of the present disclosure.
Figure 30:
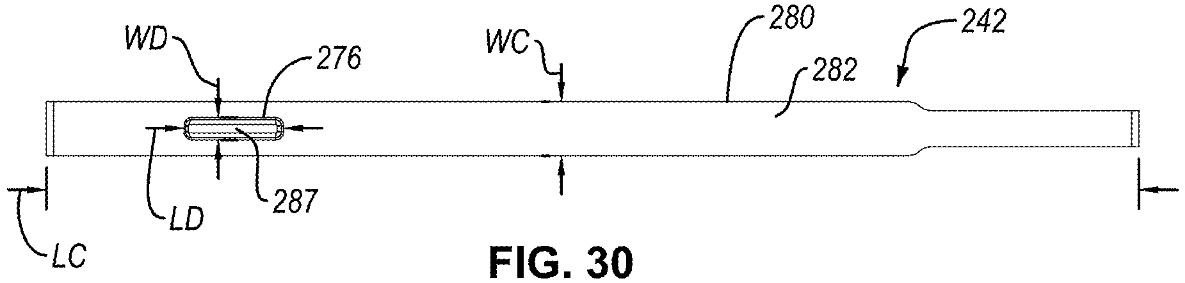
FIG. 30 is a bottom plan view of the flexible electrical contact of FIG. 27, according to one or more examples of the present disclosure.
Figure 31:
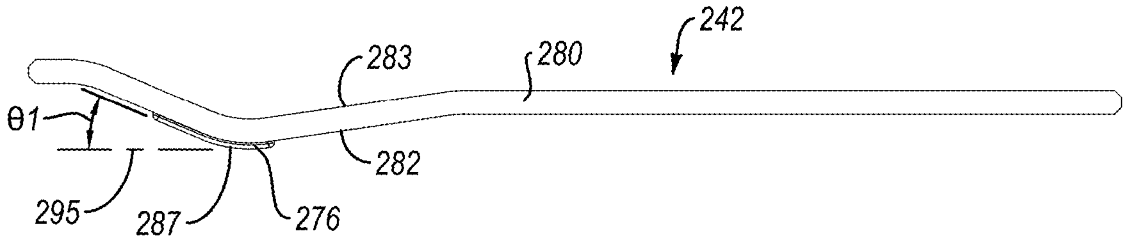
FIG. 31 is a side elevation view of the flexible electrical contact of FIG. 27, according to one or more examples of the present disclosure.

Referring to FIGS. 23-25, the annular FCB 220 includes a flexible substrate 222 and the electrical contact pads 224, which are formed on the flexible substrate 222 in annular patterns along a circumference (e.g., circumferential edge) of the flexible substrate 222. In one example, the flexible substrate 222 is initially flat and flexed into an annular or circular shape during assembly of the receptacle 204. The electrical contact pads 224 form an electrical contact-pad interface 223. The electrical contact pads 224 are located on the substrate 222 at the engagement end portion 239 of the annular FCB 220 and thus are suspended within the interior cavity of the housing 212. The electrical contact pads 224 can be formed on the flexible substrate 222 using any of various techniques, such as those described above in association with the receptacle 104. The electrical contact pads 224 on each side of the flexible substrate 222 are circumferentially non-staggered (i.e., circumferentially aligned) relative to each other, as described in more detail below. Each one of the electrical contact pads 224 is electrically coupled with an electrical trace 225 formed in or on the substrate 222. The electrical traces 225 facilitate the transmission of electrical signals between the electrical contact pads 224 and a corresponding one of the circuit boards 208. In some examples, the flexible substrate 222 includes multiple layers and the electrical traces are interposed between layers of the flexible substrate 222. The electrical contact pads 224 (and the corresponding traces) are electrically isolated from each other such that each electrical contact pad 224 facilitates a separate isolated electrical connection. The annular FCB 220 can be retained within the housing 212 in a manner similar to how the annular FCB 120 is retained within the housing 112.

The frame 289 additionally includes an annular tube that is concentric with the central axis 295. The annular tube of the frame 289 is located radially inwardly and spaced apart from the annular FCB 220. Moreover, the annular tube encircles a central pin interface 262 of the receptacle 204. However, in other embodiments, instead of an annular tube, the frame 289 may have a central engagement element that is configured to engage a corresponding engagement element formed in a housing 210 of the plug 202, which can have an outer portion 274 (see, e.g., FIGS. 23-25). The central pin interface 262 is concentric with the central axis 295 and includes a plurality of spaced-apart electrical pins, which can be configured in a manner similar to that described above in relation to the central pin interface 162.

Additionally, in some implementations, the receptacle 204 includes one or more radio-frequency (RF) or magnetic field signal interference shields configured to block RF interference or noise. For example, the shields can prevent RF or magnetic field signal interference generated by the transmission of electrical power through the electrical pins from interfering with the electrical communication signals transmitted through the electrical contact pads 224. In one implementation, the RF or magnetic field signal interference shields of the receptacle 204 are made of a Mu-metal.

Referring again to FIGS. 19-22, the plug 202 includes a housing 210 and circuit boards 206 extending from the housing 210. The circuit boards 206 may include electrical traces imprinted on an electrically-insulating substrate. Moreover, in some implementations, the circuit boards 206 can be flexible circuit boards. Each circuit board 206 is electrically coupled to one or more electrical contacts of the plug 202 at one end and other electrical connections (not shown), such as those of a medical tool, device, or system, at an opposite end.

The plug 202 further includes an electrical contact interface 240 that includes flexible electrical contacts 242 arranged in annular patterns corresponding with the annular patterns of the electrical contact pads 224 forming the electrical contact-pad interface 223 of the annular FCB 220. Referring to FIGS. 26 and 32-37, the flexible electrical contacts 242 are fixed to contact pads on opposing inner and outer surfaces of a flexible substrate 249 of an annular FCB 246. Each one of the flexible electrical contacts 242 is electrically coupled with an electrical trace of the annular FCB 246 via the corresponding contact pads. The electrical traces facilitate the transmission of electrical signals between the flexible electrical contacts 242 and a corresponding one of the circuit boards 206. In some examples, the flexible substrate 249 has multiple layers and the electrical traces are interposed between the layers. The flexible electrical contacts 242 (and the corresponding traces) are electrically isolated from each other such that each flexible electrical contact 242 facilitates a separate isolated connection. In one example, the annular FCB 246 is initially flat and flexed into an annular or circular shape during assembly of the plug 202. The flexible electrical contacts 242 can be attached to the annular FCB 246 when flat and form the annular patterns when the annular FCB 246 is flexed into the annular shape. In the illustrated examples, the width of the flexible substrate 249 is greater than the circumference of the circular shape defined by the flexible substrate 249, such that opposing ends of the flexible substrate 249 are connected (e.g., adhered, soldered, and/or fastened together) at overlapping portions of the opposing ends, as described in more detail below.

The housing 210 additionally includes a central engagement element 228 that is concentric with the central axis 295. The central engagement element 228 is located radially inwardly and spaced apart from the electrical contact interface 240. Moreover, the central engagement element 228 includes a central receptacle interface 236. The central receptacle interface 236 is concentric with the central axis 295 and includes a plurality of spaced-apart electrical pin receptacles, which can be configured in a manner similar to that described above in relation to the central receptacle interface 136. The number and configuration of the electrical pin receptacles corresponds with that of the electrical pins of the receptacle 204 so that when the plug 202 is inserted into the receptacle 204, the electric pins are inserted into and mate with the electrical pin receptacles to establish an electrical connection therebetween. It is recognized that, in alternative examples, the plug 202 includes the electrical pins 264 and the receptacle 204 includes the electrical pin receptacles.

In some implementations, the plug 202 includes one or more radio-frequency (RF) or magnetic field signal interference shields configured to block RF interference or noise. For example, the shields can prevent RF or magnetic field signal interference generated by the transmission of electrical power through the electrical receptacles from interfering with the electrical communication signals transmitted through the flexible electrical contacts 242. In one implementation, the RF or magnetic field signal interference shields of the plug 202 are made of a Mu-metal.

The plug 202 can be releasably connected to the receptacle 204 via any of various coupling mechanisms, such as active latch mechanisms, friction latch mechanisms, and the like.

Referring to FIGS. 23-25, 36, and 37, more details of the annular FCB 220 of the receptacle 204 are shown. The flexible substrate 222 of the annular FCB 220 has a thickness, a width, and a length, which are defined in the same manner as the thickness, the width, and the length of the flexible substrate 122 of the annular FCB 120. In the illustrated examples, the width of the flexible substrate 222 is greater than the circumference of the circular shape defined by the flexible substrate 222, such that opposing ends of the flexible substrate 222 are connected (e.g., adhered, soldered, and/or fastened together) at overlapping portions of the opposing ends, as described in more detail below. The flexible substrate 222 includes two opposing broad-faced surfaces, including an outer surface 226 and an inner surface 231, which face opposite directions. The outer surface 226 faces away from the central axis 295 and the inner surface 231 faces towards the central axis 295. The outer surface 226 has a convex contour and the inner surface 231 has a concave contour.

In some examples, the electrical contact pads 224 are formed on both the outer surface 226 and the inner surface 231 to maximize the number of electrical connections enabled by the electrical connector 200. Moreover, the electrical contact pads 224 of the electric contact-pad interface 223 are grouped into different annular pad patterns extending circumferentially along the width of the flexible substrate 222. Each one of the annular pad patterns includes an annular arrangement of electrical contact pads 224 spaced apart from each other in the circumferential direction along the width of the flexible substrate 222. The electrical contact pads 224 of a given annular pad pattern are circumferentially aligned (i.e., located the same distance from the end of the engagement end portion 239 in the axial direction or a plane perpendicular to the central axis 295 bisects all of the electrical contact pads 224 of the pattern).

In the illustrated example, the electrical contact pads 224 are grouped into a first pad pattern 224A and a second pad pattern 224B. The first pad pattern 224A is formed on the outer surface 226 of the flexible substrate 222. The second pad pattern 224B is formed on the inner surface 231 of the flexible substrate 222. The electrical contact pads 224 of the first pad pattern 224A and the second pad pattern 224B can be situated the same distance from the end of the engagement end portion 239, such as coexistent or flush with the end of the engagement end portion 239.

The electrical contact pads 224 of a given pad pattern are non-staggered or circumferentially aligned. Because each side of the flexible substrate 222 has only one pattern of pads, all the electrical contact pads 224 on each side of the flexible substrate 222 are non-staggered. Circumferential alignment between the electrical contact pads 224 of a given pad pattern can mean the electrical contact pads of a given pad pattern in the circumferential direction are aligned, which can mean the centers (i.e., the midpoints of the electrical contact pads in the longitudinal direction DL (see, e.g., FIG. 32), perpendicular to the circumferential direction) of the electrical contact pads are in the same plane, where the plane is perpendicular to the central axis 295.

Referring to FIGS. 23-25, 36, and 37, more details of the electrical contact interface 240 of the plug 202 are shown. The annular FCB 246 of the plug 202 has an outer surface and an inner surface, which face opposite directions. The outer surface faces away from the central axis 295 and the inner surface faces towards the central axis 295. As with the annular FCB 220, both the outer surface and the inner surface of the annular FCB 246 are contoured or curved, such that the outer surface has a convex contour and the inner surface has a concave contour. The outer surface of the annular FCB 246 includes a first pattern of contact pads and corresponding traces. Similarly, the inner surface of the annular FCB 246 includes a second pattern of contact pads and corresponding traces. In some examples, the flexible electrical contacts 242 of the electrical contact interface 240 are attached to both corresponding ones of the contact pads on the outer surface of the annular FCB 246 and corresponding ones of the contact pads on the inner surface of the annular FCB 246 to maximize the number of electrical connections enabled by the electrical connector 200. Moreover, the flexible electrical contacts 242 are grouped into different annular contact patterns extending circumferentially along the width of the annular FCB 246.

Each one of the annular contact patterns includes an annular arrangement of electrical contact points 287 (see, e.g., FIG. 35) of the flexible electrical contacts 242, which are spaced apart from each other in a circumferential direction so that a gap is defined between the flexible electrical contacts 242 defining a given annular contact pattern. Accordingly, the electrical contact points 287 of a given annular pad pattern are circumferentially aligned (i.e., located the same distance from the end 247 of the annular FCB 246). The electrical contact points 287 are the points or portions of the flexible electrical contacts 242 configured to mechanically contact and establish an electrical connection with a corresponding one of the electrical contact pads 224 when the plug 202 and the receptacle 204 are mated.

Figure 32:
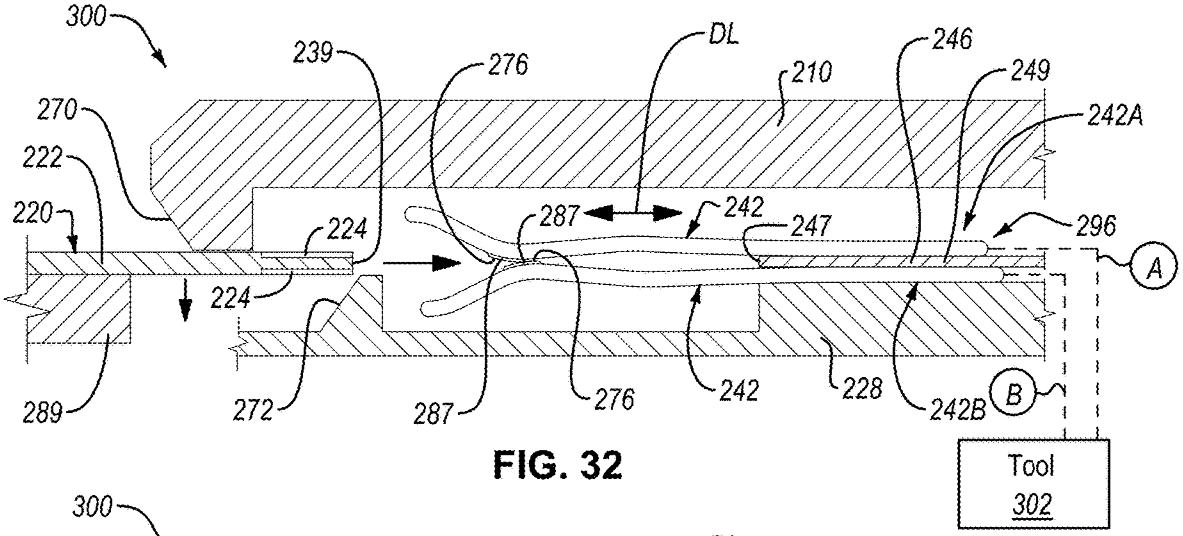
FIG. 32 is a side elevation cross-sectional view of a portion of the electrical connector of FIG. 19, taken along a plane similar to that of FIG. 26 and showing the plug and the receptacle coming into engagement, according to one or more examples of the present disclosure.
Figure 33:
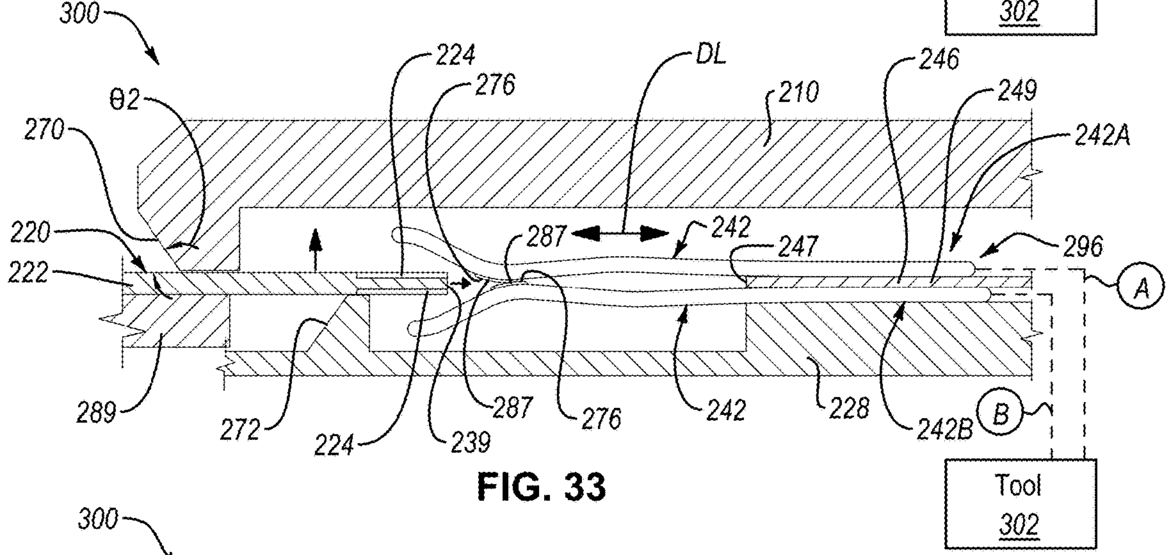
FIG. 33 is a side elevation cross-sectional view of a portion of the electrical connector of FIG. 19, taken along the plane similar to that of FIG. 26 and showing the plug and the receptacle partially engaged, according to one or more examples of the present disclosure.
Figure 34:
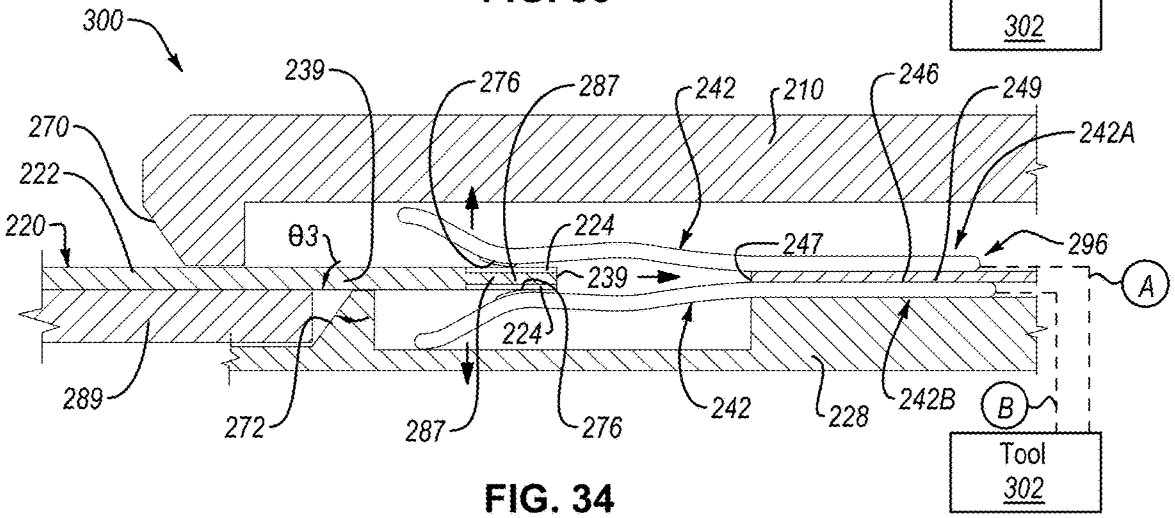
FIG. 34 is a side elevation cross-sectional view of a portion of the electrical connector of FIG. 19, taken along the plane similar to that of FIG. 26 and showing the plug and the receptacle fully engaged, according to one or more examples of the present disclosure.
Figure 35:
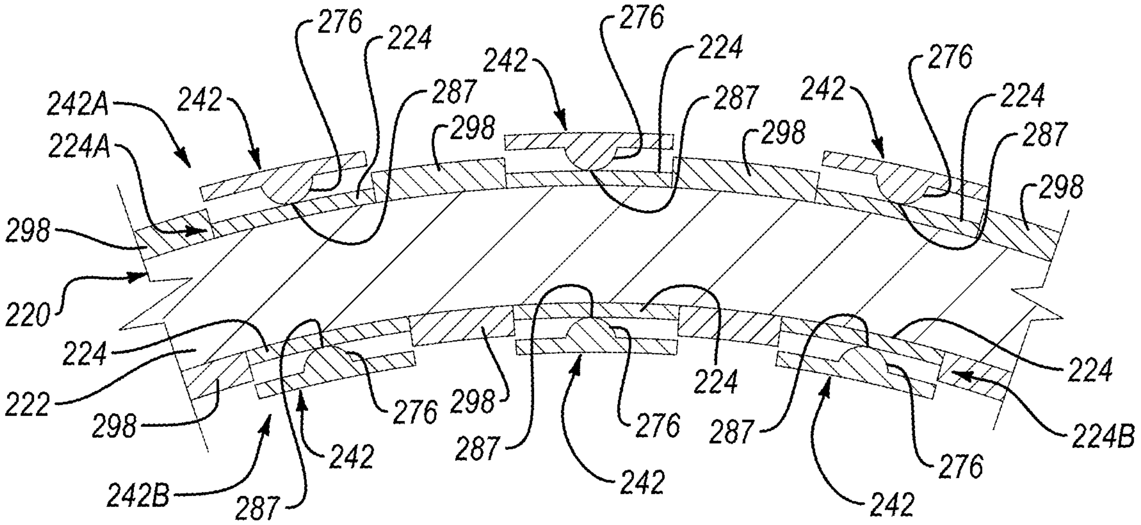
FIG. 35 is a front elevation cross-sectional view of a portion of the electrical connector of FIG. 19, taken along a plane perpendicular to a central axis of the electrical connector and shown when the plug and the receptacle are fully engaged, according to one or more examples of the present disclosure.

In the illustrated example, the flexible electrical contacts 242 are grouped into a first contact pattern 242A and a second contact pattern 242B (see, e.g., FIG. 35). The first contact pattern 242A is attached to the outer surface of the flexible substrate 249 of the annular FCB 246. In contrast, the second contact pattern 242B is attached to the inner surface of flexible substrate 249 of the annular FCB 246. As shown in FIGS. 32-34, the electrical contact points 287 of the first contact pattern 242A are longitudinally offset, in the longitudinal direction DL, relative to the electrical contact points 287 of the second contact pattern 242B, to help prevent scissoring of the flexible electrical contacts 242 that radially overlap with each other. In other words, the electrical contact points 287 of the first contact pattern 242A are situated further away from the end 247 of the annular FCB 246 than the electrical contact points 287 of the second contact pattern 242B. However, in alternative examples, the electrical contact points 287 of the first contact pattern 242A can be situated closer to the end 247 of the annular FCB 246 than the electrical contact points 287 of the second contact pattern 242B.

In some examples, such as is shown in FIGS. 32-34, the longitudinal offset between the electrical contact points 287 of the first contact pattern 242A and the second contact pattern 242B is facilitated by longitudinally offsetting the attachment points of the flexible electrical contacts 242 of the first contact pattern 242A relative to the attachment points of the flexible electrical contacts 242 of the second contact pattern 242A on the flexible substrate 249. In these examples, the flexible electrical contacts 242 of both the first contact pattern 242A and the second contact pattern 242B can be identically sized and shaped. However, in other examples (not shown), the flexible electrical contacts 242 of the first contact pattern 242A and the second contact pattern 242B are sized and shaped differently so that their attachment points on the flexible substrate 249 are not longitudinally offset, but their electrical contact points 287 are longitudinally offset.

Referring to FIGS. 27-31, the electrical contact point 287 of each one of the flexible electrical contacts 242 is proximate a cantilevered end of the corresponding flexible electrical contact 242. More specifically, the electrical contact point 287 of the flexible electrical contact 242 is defined by a contact rib 276 of the flexible electrical contact 242. The flexible electrical contact 242 includes an elongated arm 280 that extends from a fixed end of the elongated arm 280 to a free end or cantilevered end of the elongated arm 280. A length LC of the elongated arm 280 is defined as the distance between the fixed end and the free end of the elongated arm 280. The elongated arm 280 has a first broad surface 283 (facing away from the central axis 295 for the flexible electrical contacts 242 of the first contact pattern 242A and facing toward the central axis 295 for the flexible electrical contacts 242 of the second contact pattern 242B), and a second broad surface 282 (facing toward the central axis 295 for the flexible electrical contacts 242 of the first contact pattern 242A and facing away from the central axis 295 for the flexible electrical contacts 242 of the second contact pattern 242B). Each one of the first broad surface 283 and the second broad surface 282 defines a maximum width WC of the electrical contact point 287. A thickness of the elongated arm 280 is defined as the distance between the first broad surface 283 and the second broad surface 282, and can be less than the maximum width WC of the elongated arm 280.

The contact rib 276 protrudes from the second broad surface 282 toward the central axis 295 or away from the central axis 295 depending on the contact pattern. A height HD of the contact rib 276 is defined as a distance that the contact rib 276 protrudes from the second broad surface 282. In some examples, the contact rib 276 is elongated along the length LC of the elongated arm 280. In other words, a length LD of the contact rib 276, which extends parallel to the length LC of the elongated arm 280, is greater than a width WD of the contact rib 276. Moreover, the length LD of the contact rib 276 is greater than the length LC of the elongated arm 280 and the width WD of the contact rib 276 is less than the width WC of the elongated arm 280. Accordingly, the contact rib 276 extends along only a small portion of the length LC of the elongated arm 280 and along only a portion of the width WC of the elongated arm 280. In some examples, the length LD of the contact rib 276 is less than 10%, less than 5%, or less than 3% of the length LC of the elongated arm 280, and the width WD of the contact rib 276 is less than 60%, less than 50%, less than 40%, or less than 30% of the width WC of the elongated arm 280.

In some examples, the flexible electrical contacts 242 are made using a metal stamping process. For example, each flexible electrical contact 242 can be formed by stamping without a subsequent bending of the flexible electrical contact 242. When stamping the flexible electrical contact 242 to form the contact rib 276 in second broad surface 282, a corresponding recess 278 is formed in the first broad surface 283.

The contact rib 276 is coupled to (e.g., formed in) a cantilevered end portion of the elongated arm 280. For each one of the flexible electrical contacts 242 of the first contact pattern 242A, an angled section of the cantilevered end portion is angled away from the central axis 295 and at an angle θ1 relative to the central axis 295. In contrast, for each one of the flexible electrical contacts 242 of the second contact pattern 242B, an angled section of the cantilevered end portion is angled toward the central axis 295 at the angle θ1 relative to the central axis 295. At least a portion of the contact rib 276 is coupled to the angled section of the cantilevered end portion of the elongated arm 280, such that at least a portion of the contact rib 276 is angled at the angle θ1 relative to the central axis 295.

Each one of the flexible electrical contacts 242 of the first contact pattern 242A is circumferentially aligned with a corresponding one of the flexible electrical contacts 242 of the second contact pattern 242B. In other words, along a radial plane parallel to and passing through the central axis 295, each one of the flexible electrical contacts 242 of the first contact pattern 242A overlaps with a corresponding one of the flexible electrical contacts 242 of the second contact pattern 242B. Accordingly, the flexible electrical contacts 242 of the first contact pattern 242A and the second contact pattern 242B can be divided into multiple pairs of overlapping ones of the flexible electrical contacts 242. Referring to FIGS. 32-34, which depicts a representative pair of overlapping ones of the flexible electrical contacts 242, the flexible electrical contacts 242 of each pair are pre-loaded or pre-biased toward each other, such that before the plug 202 is mated with the receptacle 204, the flexible electrical contacts 242 of each pair are in contact with each other at a location away from the end 247 of the annular FCB 246. In certain examples, before the plug 202 is mated with the receptacle 204, the contact ribs 276 of the flexible electrical contacts 242 of each pair are in contact with each other.

Referring to FIGS. 22, 26, and 32-34, the plug 202 further includes features for ensuring circularity of the annular FCB 220 and concentricity of the annular FCB 220 with the central axis 295 before the annular FCB 220 of the receptacle 204 is mated with the flexible electrical contacts 242 of the plug 202. According to one example, the plug 202 includes an outer chamfer 270 and an inner chamfer 272. The outer chamfer 270 is formed in the housing 210 of the plug 202 and the inner chamfer 272 is formed in the central engagement element 228 of the plug 202. Each one of the outer chamfer 270 and the inner chamfer 272 has an angled surface that faces toward the annular FCB 220 of the receptacle 204 as the receptacle 204 and the plug 202 are being mated. Moreover, the angled surface of the outer chamfer 270 is angled to face radially inwardly toward the central axis 295 and the inner chamfer 272 is angled to face radially outwardly away from the central axis 295. The angled surface of the outer chamfer 270 defines a second angle θ2 relative to the central axis 295 (see, e.g., FIG. 33) and the angled surface of the inner chamfer 272 defines a third angle θ3 relative to the central axis 295 (see, e.g., FIG. 34). In some examples, the second angle θ2 is the same as the third angle θ3. However, in other examples, the second angle θ2 is different than (e.g., less than) the third angle θ3. The outer chamfer 270 and the inner chamfer 272 have a generally annular or ring-like shape. The angled surfaces of the outer chamfer 270 and the inner chamfer 272 can be a continuous, annular-shaped surface. However, in other examples, such as shown, the angled surface of each one of the outer chamfer 270 and the inner chamfer 272 is made up of a series of spaced apart segments. In such examples, because the segments are arranged in an annular pattern, the chamfers are still considered annular chamfers for purposes of this disclosure.

The outer chamfer 270 and the inner chamfer 272 are radially offset by a distance substantially equal to or just greater than a thickness of the annular FCB 220 at the electric contact-pad interface 223. Additionally, in certain examples, the outer chamfer 270 and the inner chamfer 272 are longitudinally offset, such that the outer chamfer 270 is closer to the receptacle 204 than the inner chamfer 272 as the receptacle 204 is being mated with the plug 202.

Figure 20:
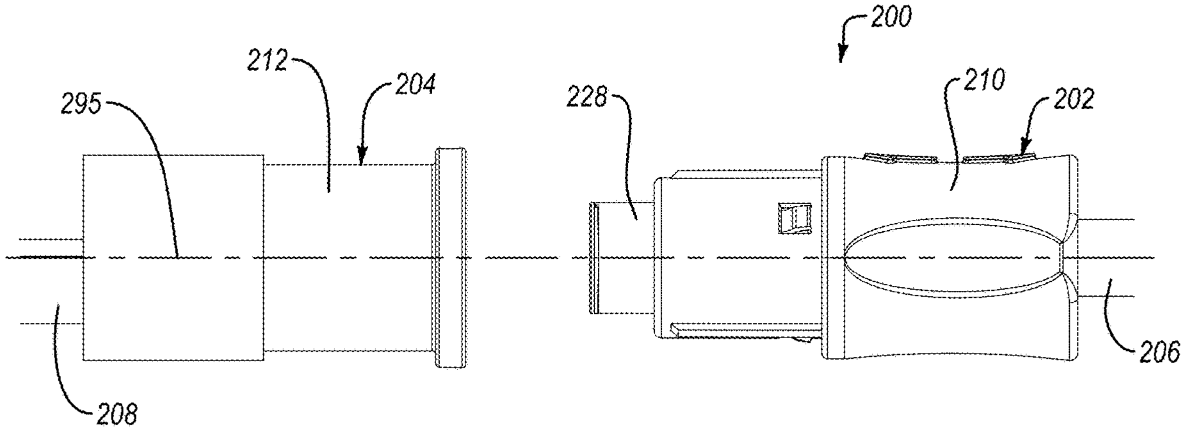
FIG. 20 is a side elevation exploded view of the electrical connector of FIG. 19, according to one or more examples of the present disclosure.
Figure 21:
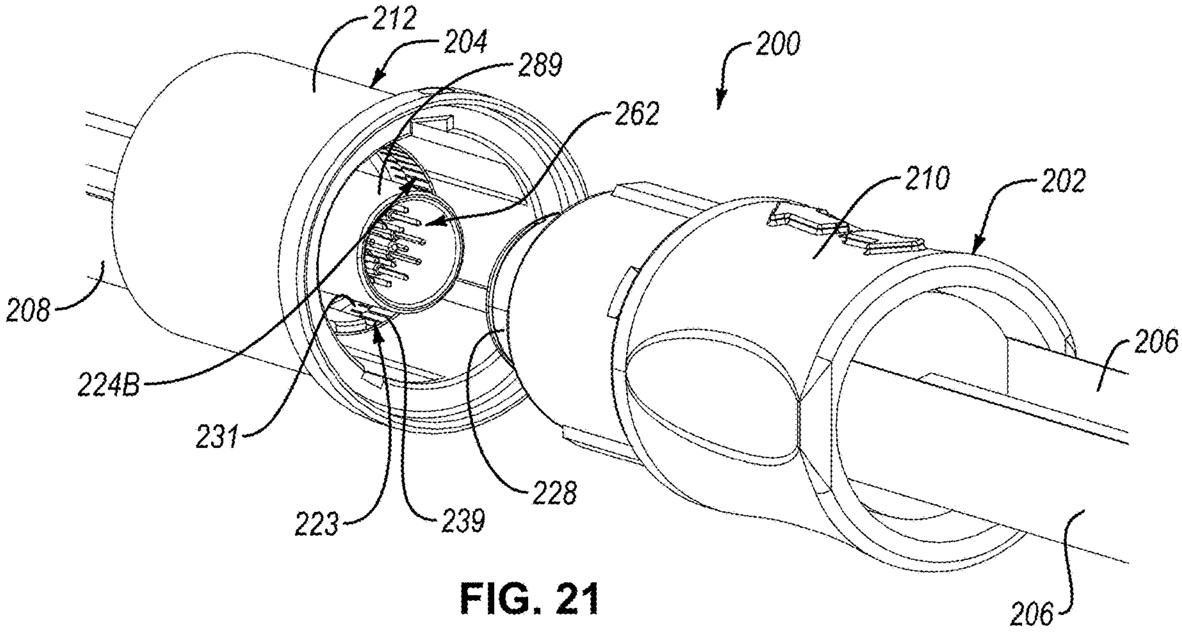
FIG. 21 is a perspective view of the electrical connector of FIG. 19, showing a plug and a receptacle of the electrical connector separated and shown from a plug side of the electrical connector, according to one or more examples of the present disclosure.
Figure 22:
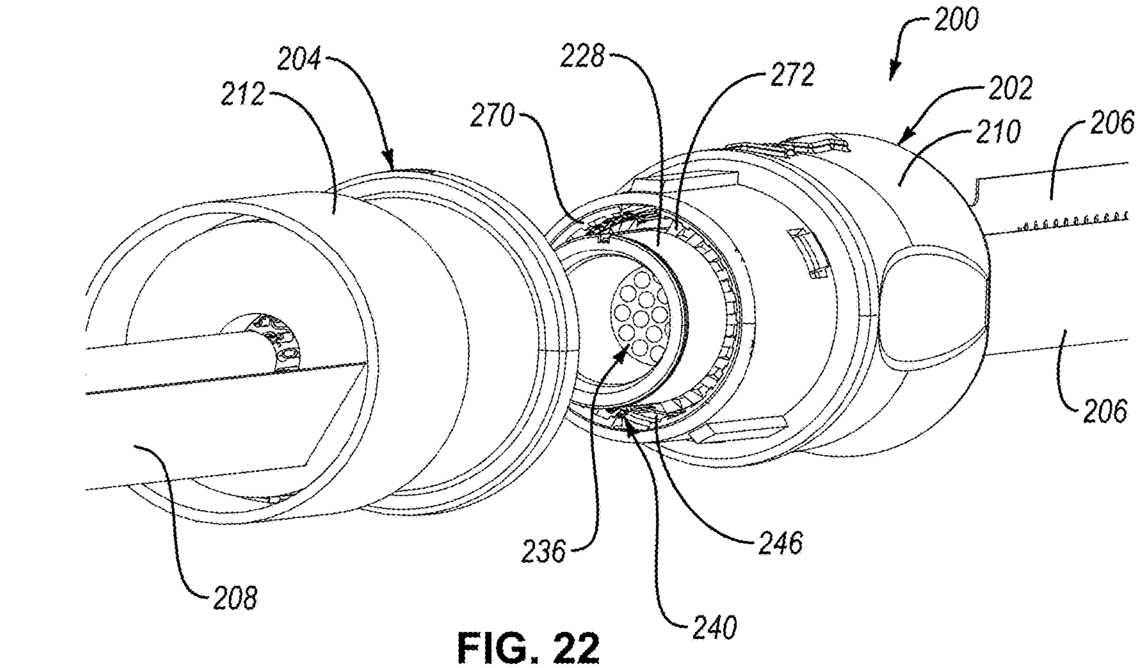
FIG. 22 is a perspective view of the electrical connector of FIG. 19, showing the plug and the receptacle separated and shown from a receptacle side of the electrical connector, according to one or more examples of the present disclosure.

Referring to FIGS. 20 and 23, with the central axis of the plug 202 and the central axis of the receptacle 204 being substantially coaxial, the plug 202 can be inserted into the receptacle 204. As shown in FIG. 32, as the plug 202 is inserted into the receptacle 204 in the longitudinal direction DL, any part of the engagement end portion 239 of the annular FCB 220 of the receptacle 204, which renders the engagement end portion 239 radially outwardly lopsided (non-round and larger than an intended circumference), slidably engages the outer chamfer 270 of the housing 210. Slidable engagement with the angled surface of the outer chamfer 270 urges the part radially inwardly, as shown by a directional arrow, and within an intended circumference. Referring again to FIG. 32, as the plug 202 is further inserted into the receptacle 204, any part of the engagement end portion 239 of the annular FCB 220 of the receptacle 204, which renders the engagement end portion 239 radially inwardly lopsided (non-round and smaller than an intended circumference), slidably engages the inner chamfer 272 of the central engagement element 228. Slidable engagement with the angled surface of the inner chamfer 272 urges the part radially outwardly, as shown by a directional arrow, to meet the intended circumference. In this manner, the outer chamfer 270 and the inner chamfer 272 ensure that the engagement end portion 239 of the annular FCB 220 is round and concentric with the central axis 295 as the engagement end portion 239 approaches the flexible electrical contacts 242 (see, e.g., FIG. 33). The engagement end portion 239 of the annular FCB 220, being round before engaging the flexible electrical contacts 242, promotes a strong and reliable connection between the flexible electrical contacts 242 and the electrical contact pads 224 (as described in more detail below), as well as minimizing possible damage to the annular FCB 220 by the electrical contact pads 224. Additionally, in some examples, the outer chamfer 270 and the inner chamfer 272 apply opposing retention forces to (e.g., clamp) the annular FCB 220 when the plug 202 and the receptacle 204 are fully engaged to help retain the annular FCB 220 in place during use.

Further insertion of the plug 202 into the receptacle 204 ultimately causes the engagement end portion 239 of the annular FCB 220 to contact the flexible electrical contacts 242. Contact with the flexible electrical contacts 242 urges each pair of flexible electrical contacts 242 to flex away from each other so that the contact ribs 276 separate from each other on account of the engagement end portion 239 passing therebetween. Referring to FIG. 35, the contact ribs 276 of the flexible electrical contacts 242 engage corresponding ones of the electrical contact pads 224 to establish an electrical connection with the corresponding ones of the electrical contact pads 224. Engagement includes radial flexing (i.e., flexing in a radial direction) of the flexible electrical contacts 242 and sliding of the electrical contact points 287, defined by the contact ribs 276, along the at least a portion of the corresponding ones of the electrical contact pads 224. The cantilevered ends of the flexible electrical contacts 242, including the contact ribs 276, being angled, beveled, or sloped, helps to facilitate initial engagement with the substrate 222 and initial radial flexing of the flexible electrical contacts 242.

In the illustrated examples, the flexible electrical contacts 242 of the first contact pattern 242A flex radially outwardly away from the central axis 295 so that the electrical contact point 287 of each one of the flexible electrical contacts 242 of the first contact pattern 242A makes electrical contact with a corresponding one of the electrical contact pads 224 of the first pad pattern 224A. In contrast, the flexible electrical contacts 242 of the second contact pattern 242B flex radially inwardly toward the central axis 295 so that the electrical contact point 287 of each one of the flexible electrical contacts 242 of the second contact pattern 242B makes electrical contact with a corresponding one of the electrical contact pads 224 of the second pad pattern 124B.

In some examples, the force applied to each other by the electrical contact points 287 of a given pair of opposing flexible electrical contacts 242 is between, and inclusive, of 0 and 40 grams. In contrast, in some examples, when the plug 202 is mated with the receptacle 204, the electrical contact point 287 of each one of the flexible electrical contacts 242 applies a force to a corresponding one of the electrical contact pads 124 that is between, and inclusive of, 15 and 60 grams.

In some instances, the flexible electrical contacts 242, being flexible and cantilevered, may be prone to lateral movement (e.g., in circumferential direction) and scissoring relative to a radially adjacent flexible electrical contact 242. In certain examples, as shown in FIG. 35, the annular FCB 220 (as well as the annular FCB 246), includes a solder mask 298 on each one of the outer surface 226 and the inner surface 231, and between the electrical contact pads 224.

The solder mask 298 facilitates the formation of the electrical contact pads 224 on the flexible substrate 222, and remains on the flexible substrate 222. In certain examples, the electrical contact pads 224 are recessed relative to the solder mask 298. The contact rib 276, protruding from the elongated arm 280, helps to maintain a proper electrical connection between the flexible electrical contact 242 and the electrical contact pad 224, even when the elongated arm 280 may be experiencing a scissoring effect. Without the contact rib 276, the flexible electrical contact 242 would have to be properly aligned with the electrical contact pad 224 to ensure electrical contact between the flexible electrical contact 242 and the electrical contact pad 224 because any scissoring (lateral movement) of the flexible electrical contact 242 would result in the solder mask 298 interfering with the ability of the flexible electrical contact 242 to flex into contact with the electrical contact pad 224.

Figure 36:
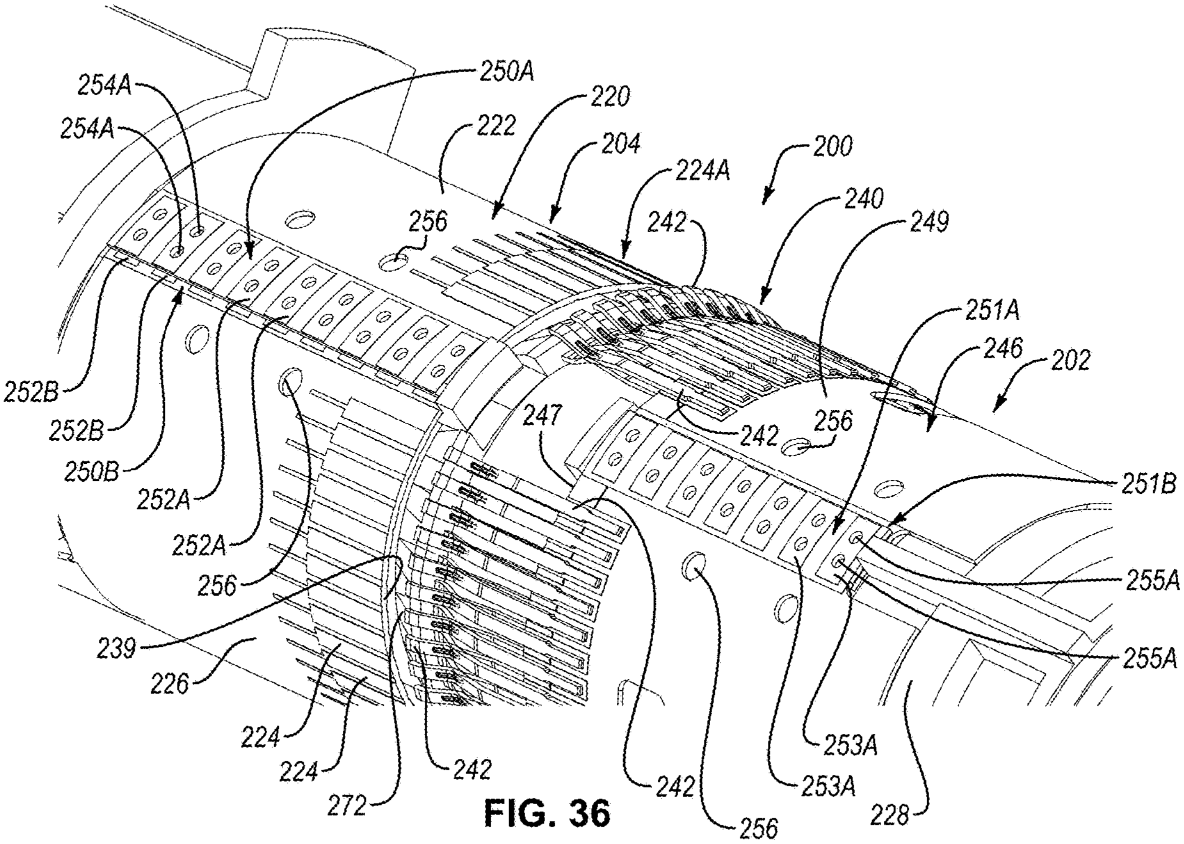
FIG. 36 is a perspective view of an electrical connector, according to one or more examples of the present disclosure.

Referring to FIG. 36, in some examples, the overlapping portions of the flexible substrate 222 and the flexible substrate 249 are connected together via corresponding solder bridges. For example, the flexible substrate 222 of the annular FCB 220 includes a first overlapping portion 250A and a second overlapping portion 250B at corresponding ends of the flexible substrate 222. As used herein, in some examples, an overlapping portion can be defined as a overlapping side portion because side portions of the flexible substrate are overlapping. The first overlapping portion 250A and the second overlapping portion 250B form an overlapping joint. The joint is held together by solder bridges each defined by a corresponding one of first solder pads 252A, formed in the first overlapping portion 250A, a corresponding one of second solder pads 252B, formed in the second overlapping portion 250B, and solder (not shown) between the first solder pads 252A and the second solder pads 252B. The first solder pads 252A and the second solder pads 252B are made of a metallic material, and the surrounding portions of the flexible substrate 222. According to one example, each solder bridge is formed by applying a solder material onto the second solder pads 252B before the overlapping portions are overlapped. The first overlapping portion 250A and the second overlapping portion 250B are then overlapped such that a corresponding one of the first solder pads 252A overlaps with a corresponding one of the second solder pads 252B, and the solder material is interposed between the first solder pads 252A and the second solder pads 252B. The solder material is heated to reflow the solder and fuse the solder material to the first solder pads 252A and the second solder pads 252B, thus creating a soldered overlapping joint between the first overlapping portion 250A and the second overlapping portion 250B.

In some examples, each one of the first solder pads 252A includes one or more vias 254A or holes, which extend entirely through the first solder pads 252A. The vias 254A, being open to the solder material between the first solder pads 252A and the second solder pads 252B, enables the solder material, when reflowed, to flow into and through vias 254A. Accordingly, when reflowed, a portion of the solder material is located within the vias 254A and, optionally, on top of the first solder pads 252A. When hardened, the solder material in the vias 254A and on top of the first solder pads 252A promotes a stronger soldered overlapping joint between the first solder pads 252A and the second solder pads 252B.

Similar to the flexible substrate 222 of the annular FCB 120, the flexible substrate 249 of the annular FCB 246 includes a first overlapping portion 251A and a second overlapping portion 251B at corresponding ends of the flexible substrate 249 that form an overlapping joint. The joint is held together by solder bridges each defined by a corresponding one of first solder pads 253A, formed in the first overlapping portion 251A, a corresponding one of second solder pads 253B, formed in the second overlapping portion 251B, and solder (not shown) between the first solder pads 253A and the second solder pads 253B. In some examples, to help form the overlapping soldered joint, each one of the first solder pads 253A includes one or more vias 255A or holes, which extend entirely through the first solder pads 253A.

Figure 38:
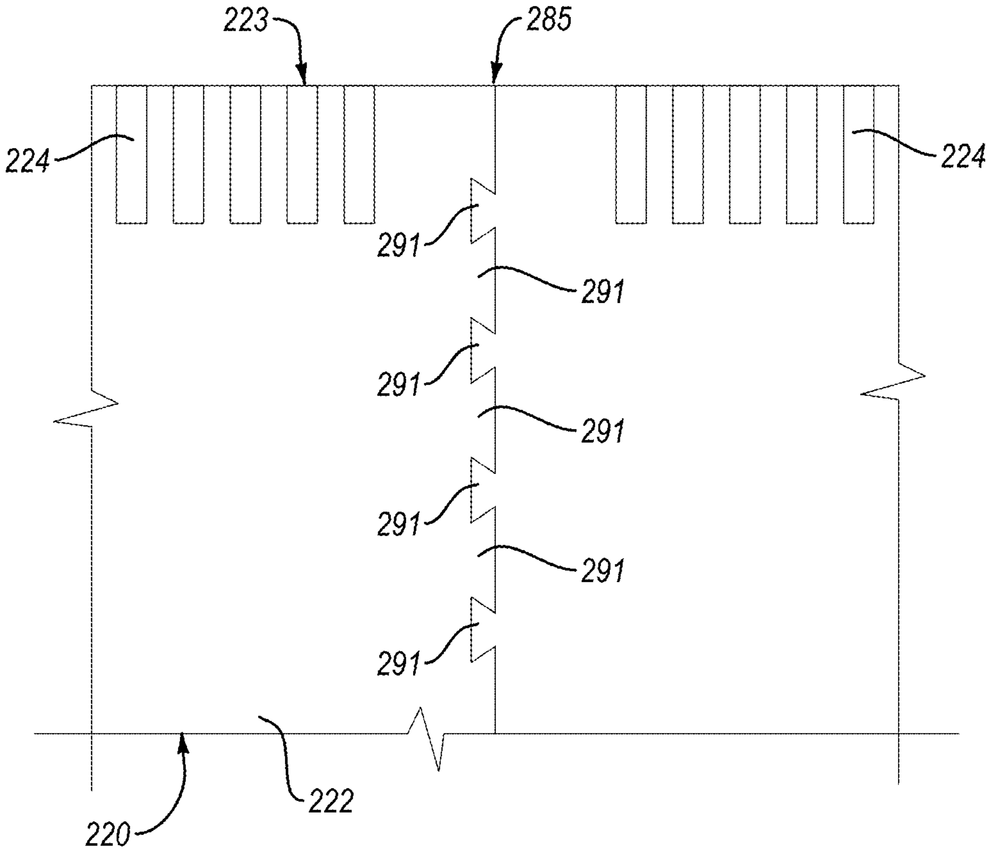
FIG. 38 is a top plan view of an annular flexible circuit board of an electrical connector, according to one or more examples of the present disclosure.

According to alternative examples, as shown in FIG. 38, opposing sides of the flexible substrates (e.g., the flexible substrate 222) can be joined together via an interlocking joint 285 to form the flexible substrates into a circular shape or a hoop. In one example, the interlocking joint 285 includes a plurality of interlocking features 291, such as tabs, ears, tongues, etc. The interlocking features 291 of one side of the flexible substrate engage with the interlocking features 291 of the opposite side of the flexible substrate to form the interlocking joint 285. More specifically, in one example, the interlocking features 291 (e.g., tongues) of one end of the flexible substrate are inserted into corresponding grooves of the opposite end of the flexible substrate, and vice versa. A bonding agent or adhesive can be applied onto and/or between the interlocking features 291 along the interlocking joint 285 to strengthen the interlocking joint 285.

As the opposing sides of the flexible substrate are brought together, and the flexible substrate is shaped into a circle or hoop, temporarily holding the opposing sides together while the permanent joint between the opposing sides is formed can be difficult. Accordingly, in one example, the flexible substrate (e.g., the flexible substrate 222 and/or the flexible substrate 249) includes one or more apertures 256 adjacent to each one of the opposing sides of the flexible substrate. More specifically, in certain examples, the flexible substrate 222 includes a pair of apertures 256 adjacent one side of the flexible substrate 222 and a pair of apertures 256 adjacent the opposite side of the flexible substrate 222. Likewise, in some examples, the flexible substrate 249 includes a pair of apertures 256 adjacent one side of the flexible substrate 249 and a pair of apertures 256 adjacent the opposite side of the flexible substrate 249. Although not shown, a fixation tool (e.g., e.g., a clamp, buckle, latch, etc.) can span the joint between opposing sides of a flexible substrate and engage the apertures 256 of the flexible substrate to prevent the opposing sides from separating while being joined together. According to some alternative examples, the apertures 256 can be replaced or supplemented by different types of engagement elements that promote attachment of a fixation tool to the flexible substrate. It is also recognized that in some examples, the flexible electrical contacts 242 are electrically connected (e.g., soldered) to the annular FCB 246, when flat and before the annular FCB 246 is shaped into the annular shape.

Figure 37:
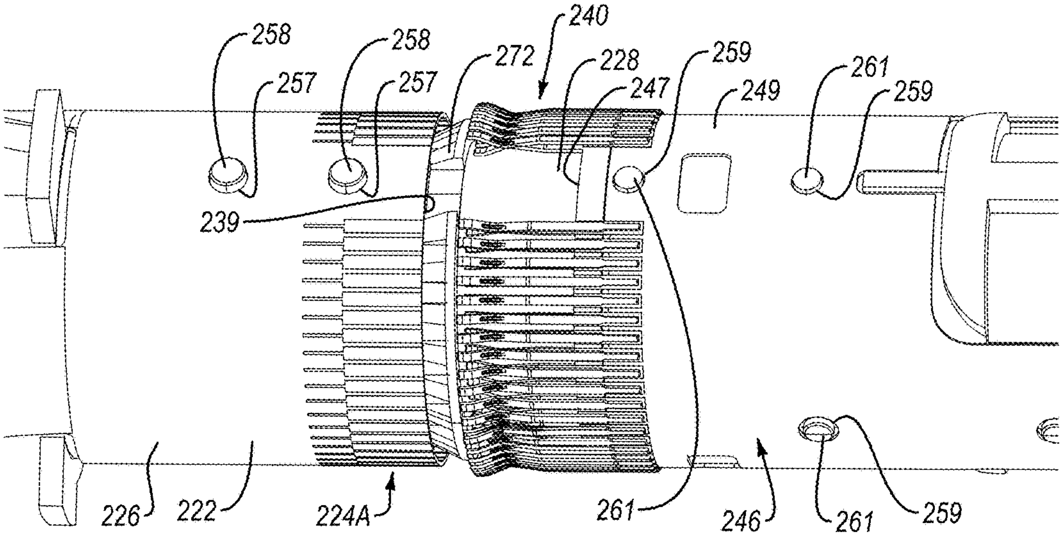
FIG. 37 is another perspective view of the electrical connector of FIG. 36, according to one or more examples of the present disclosure.

As shown in FIG. 37, in certain examples, the annular FCB 220 includes registration features, such as registration apertures 257. The housing 212 or the frame 289 can also include corresponding registration features, such as pins 258, protrusions, or tabs, that engage the registration features (e.g., the registration apertures 257) of the annular FCB 220. Engagement between the registration features of the annular FCB 220 and the housing 212 or the frame 289 helps to properly locate and orientate the annular FCB 220 relative to the housing 212 or the frame 289. Like the annular FCB 220, the annular FCB 246 includes registration features, such as registration apertures 259, which can engage registration features, such as pins 261, of the housing 210 or the central engagement element 228 to help properly locate and orientate the annular FCB 246 relative to the housing 210 or the central engagement element 228.

Figure 39:
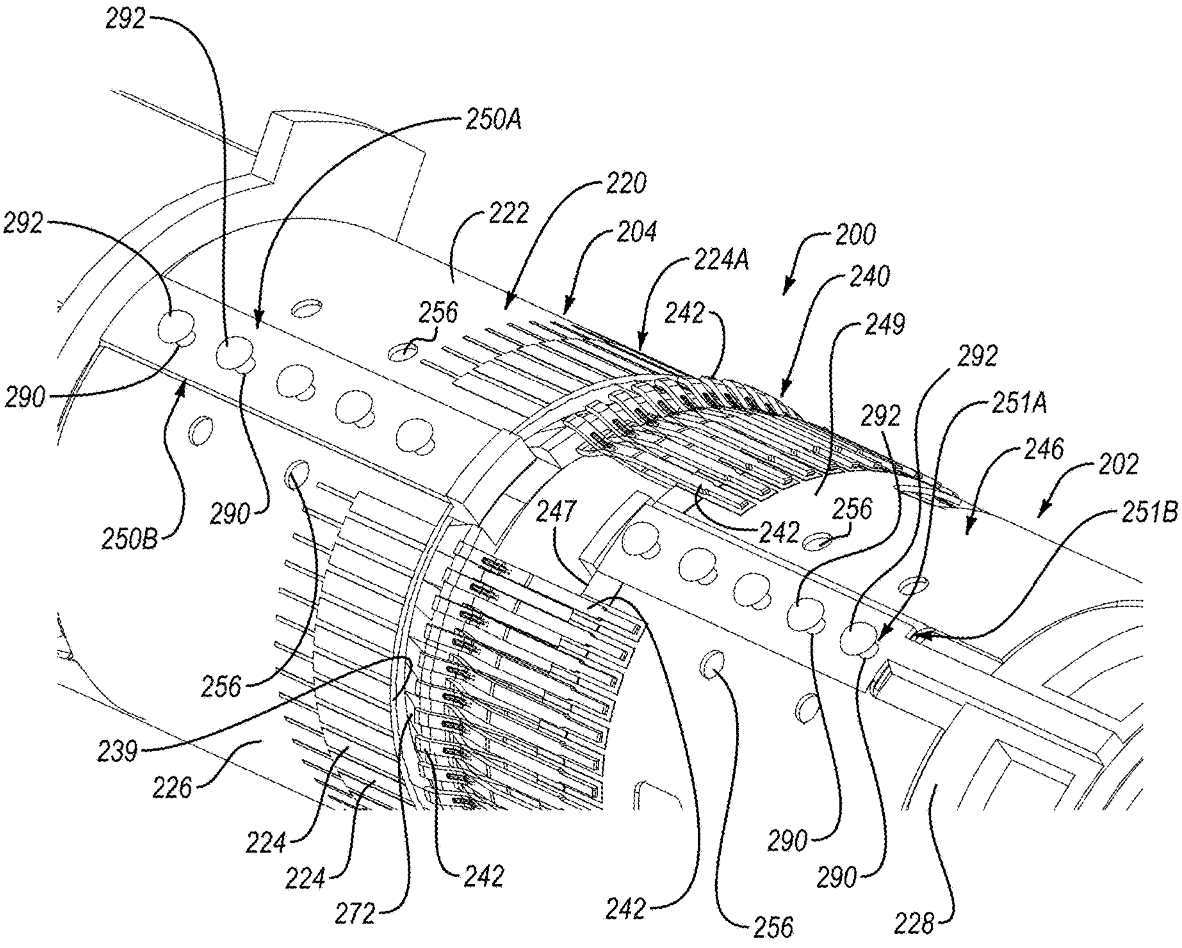
FIG. 39 is a perspective view of an electrical connector, according to one or more examples of the present disclosure.

According to alternative examples, as shown in FIG. 39, the first overlapping portion 250A and the second overlapping portion 250B of the receptacle 204 are coupled together, to form the overlapping joint, via a plurality of posts 292 (e.g., pegs) formed in the housing 112 or other portion of the receptacle 104. Each overlapping portion includes openings 290 (e.g., apertures) that are alignable with each other when the annular FCB 220 has a predetermined circumference. Moreover, the posts 292 are located on the housing 112 so that when the openings 290 are aligned, a corresponding one of the posts 292 can pass through the aligned openings. In this manner, a predetermined circumference of the annular FCB 220 can be achieved and maintained during assembly and use of the receptacle 204. For example, according to some embodiments, during assembly of the receptacle 204, the annular FCB 220 is positioned so that the posts 292 pass through the corresponding openings 290 of the second overlapping portion 250B, thus securing the second overlapping portion 250B relative to the housing 112. Then, the annular FCB 220 is reshaped into a circular shape so that the posts 292 also pass through the corresponding openings 290 of the first overlapping portion 250A, thus forming the overlapping joint and securing the first overlapping portion 250A relative to the housing 112. The position of the openings 290 on the annular FCB 220 are precisely controlled so that when the posts 292 pass through the openings 290 of the first overlapping portion 250A and the second overlapping portion 250B, the circumference of the annular FCB 220 is a predetermined desired circumference. To retain the overlapping portions on the posts 292, a heat staking process can be applied to the posts 292 to melt down a portion of the posts 292, which forms a retention portion of the posts 292. The retention portion has a size that is greater than the openings so that the annular FCB 220 does not slide off of the posts 292 and the annular FCB 220 is retained on the housing 112 with the predetermined desired circumference. Techniques, other than or in addition to heat staking, can be used to retain the overlapping portions on the posts 292, such as adhesion techniques, bonding techniques, or the like.

Also shown in FIG. 39, the first overlapping portion 251A and the second overlapping portion 251B of the plug 202 are coupled together, to form the overlapping joint, via engagement between openings 290 in the annular FCB 246 and a plurality of posts 292 formed in the housing 110 or other portion of the plug 102, in the same manner as described above for the receptacle 204. Like the receptacle 203, the position of the openings 290 on the annular FCB 246 are precisely controlled so that when the posts 292 pass through the openings 290 of the first overlapping portion 251A and the second overlapping portion 251B, the circumference of the annular FCB 246 is a predetermined desired circumference. The annular FCB 246 can be retained on the housing 110 via heat staking processing of the posts 292 as described above.

Referring to FIGS. 32-34, according to some examples, a system 300 includes the plug 202 and a tool 302. The tool 302 is electrically coupled to the flexible electrical contacts 242, such as via the annular FCB 246. For example, as shown, the tool 302 is separately electrically coupled to each one of the pair of flexible electrical contacts 242. The tool 302 transmits data signals to and/or receives data signals from and a corresponding tool control system electrically coupled with the tool 302 when the plug 202 is properly mated with the receptacle 204, which separates (e.g., electrically isolates) the flexible electrical contacts 242 of the pair. The intensity of the data signals is small and can be difficult to detect. However, before the plug 202 is mated with the tool 302, the flexible electrical contacts 242 of the pair are electrically connected such that a circuit, including the flexible electrical contacts 242 of the pair, is shorted. In certain examples, the tool 302 is configured to sense a short in the circuit containing the pair of flexible electrical contacts 242. In other words, the tool 302 is configured to detect when the pair of flexible electrical contacts 242 are electrically connected (i.e., unseparated). In some examples, the tool 302 includes electronic circuitry, one or more electronic controllers, and/or one or more computer modules that are programmed to detect when the pair of flexible electrical contacts 242 are electrically connected.

Prior to mating the plug 202 with the receptacle 204, each pair of flexible electrical contacts 242 are electrically connected or shorted. When the plug 202 and the receptacle 204 are properly mated, each pair of flexible electrical contacts 242 are separated and the short circuit is removed. Therefore, the tool 302 is enabled to determine whether the plug 202 and the receptacle 204 are properly mated by sensing the existence or absence of a short circuit between at least one pair of flexible electrical contacts 242. Because sensing the existence of a short circuit is easier than detecting the presence of a data signal through a flexible electrical contact, determining a proper connection between the plug 202 and the receptacle 204 via detection of a short circuit is more accurate and reliable than via detection of a data signal. In this manner, the system 300 can provide a fail-safe method of ensuring the proper electrical mating between the plug 202 and the receptacle 204.

The electrical connectors disclosed herein include a first portion that is mateable to a second portion. Based on conventional definitions for a plug and a receptacle of an electrical connector, the first portion and the second portion of the electrical connectors disclosed herein have been labeled a plug and a receptacle according to the conventional definitions. However, as used herein, the terms plug and receptacle are merely labels and need not connote certain functionality or features associated with conventional plugs and receptacles. Accordingly, in some examples and according to a broad interpretation, the plug of the electrical connectors disclosed herein can be considered a receptacle, and the receptacles of the electrical connectors disclosed herein can be considered a plug. Accordingly, as used herein, a plug of an electrical connector is merely a first portion of the electrical connector and a receptacle of the electrical connector is merely a second portion of the electrical connector.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

In the above description, certain terms may be used such as "up," "down," "upper," "lower," "horizontal," "vertical," "left," "right," "over," "under" and the like. These terms are used, where applicable, to provide some clarity of description when dealing with relative relationships. But these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent to another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An electrical connector, comprising:

a receptacle comprising:

a first annular flexible circuit board; and first electrical contacts coupled to the first annular flexible circuit board, electrically isolated from each other, and arranged in at least one receptacle annular pattern; and a plug comprising:

a second annular flexible circuit board; and second electrical contacts coupled to the second annular flexible circuit board, electrically isolated from each other, and arranged in at least one plug annular pattern;

wherein:

the plug is selectively connectable with the receptacle; and when the plug is selectively connected with the receptacle, each one of the first electrical contacts of the receptacle is in physical contact with a corresponding one of the second electrical contacts of the plug.

2. The electrical connector according to claim 1, wherein the first electrical contacts of the receptacle are electrical contact pads; and the second electrical contacts of the plug are flexible electrical contacts.

3. The electrical connector according to claim 1, wherein:

the first annular flexible circuit board of the receptacle comprises a first outer surface and a first inner surface separated from the first outer surface by a thickness of the first annular flexible circuit board;

the receptacle comprises multiple receptacle annular patterns, wherein one of the receptacle annular patterns is attached to the first outer surface of the first annular flexible circuit board and another one of the receptacle annular patterns is attached to the first inner surface of the first annular flexible circuit board;

the second annular flexible circuit board of the plug comprises a second outer surface and a second inner surface separated from the first outer surface by a thickness of the second annular flexible circuit board; and the plug comprises multiple plug annular patterns, wherein one of the plug annular patterns is attached to the second outer surface of the second annular flexible circuit board and another one of the plug annular patterns is attached to the second inner surface of the second annular flexible circuit board.

4. The electrical connector according to claim 3, wherein:

the second electrical contacts of the plug are flexible electrical contacts; and each one of the flexible electrical contacts comprises an elongated arm and a contact rib protruding from the elongated arm.

5. The electrical connector according to claim 4, wherein:

each one of the flexible electrical contacts of the plug annular pattern attached to the second outer surface forms a pair of flexible electrical contacts with a corresponding one of the flexible electrical contacts of the plug annular pattern attached to the second inner surface;

when the plug is not selectively connected with the receptacle, the contact ribs of each pair of flexible electrical contacts are in contact with each other; and when the plug is selectively connected with the receptacle, the contact rib of a first one of the flexible electrical contacts of each pair of flexible electrical contacts is in physical contact with a corresponding one of the first electrical contacts of the receptacle annular pattern attached to the first outer surface of the first annular flexible circuit board and the contact rib of a second one of the flexible electrical contacts of each pair of flexible electrical contacts is in physical contact with a corresponding one of the first electrical contacts of the receptacle annular pattern attached to the first inner surface of the first annular flexible circuit board.

6. The electrical connector according to claim 4, wherein the contact ribs of each pair of flexible electrical contacts are staggered relative to each other in a direction parallel to a central axis of the plug.

7. The electrical connector according to claim 4, wherein the contact rib of each one of the flexible electrical contacts is elongated, in a direction parallel to a central axis of the plug, and angled relative to the central axis of the plug.

8. The electrical connector according to claim 6, wherein, for each one of the flexible electrical contacts, a width of the contact rib is less than 60% of a width of the flexible electrical contact.

9. The electrical connector according to claim 6, wherein, for each one of the flexible electrical contacts, a length of the contact rib is less than 10% of a length of the flexible electrical contact.

10. The electrical connector according to claim 1, wherein:

the receptacle further comprises a solder mask on the first annular flexible circuit board between the first electrical contacts; and the first electrical contacts are recessed relative to the solder mask.

11. The electrical connector according to claim 1, wherein at least one of:

the receptacle comprises a receptacle housing that comprises a plurality of posts, the first annular flexible circuit board comprises opposing first side portions overlapping each other and each comprising a plurality of openings, each one of the openings of a first one of the opposing first side portions is aligned with a corresponding one of the openings of a second one of the opposing first side portions, and each one of the plurality of posts passes through a corresponding one of multiple pairs of aligned openings of the opposing first side portions; or the plug comprises a plug housing that comprises a plurality of posts, the second annular flexible circuit board comprises opposing second side portions overlapping each other and each comprising a plurality of openings, each one of the openings of a first one of the opposing second side portions is aligned with a corresponding one of the openings of a second one of the opposing second side portions, and each one of the plurality of posts passes through a corresponding one of multiple pairs of aligned openings of the opposing second side portions.

12. The electrical connector according to claim 11, wherein:

when the receptacle comprises a receptacle housing that comprises a plurality of posts, each one of the plurality of posts has a retention portion larger than the aligned openings of the corresponding one of the multiple pairs of aligned openings of the opposing first side portions so that each one of the multiple pairs of aligned openings of the opposing first side portions is retained on a corresponding one of the plurality of posts; and when the plug comprises a plug housing that comprises a plurality of posts, each one of the plurality of posts has a retention portion larger than the aligned openings of the corresponding one of the multiple pairs of aligned openings of the opposing second side portions so that each one of the multiple pairs of aligned openings of the opposing second side portions is retained on a corresponding one of the plurality of posts.

13. The electrical connector according to claim 11, wherein:

when the receptacle comprises a receptacle housing that comprises a plurality of posts, the plurality of posts of the receptacle housing are retained within the multiple pairs of aligned openings via an adhesive; and when the plug comprises a plug housing that comprises a plurality of posts, the plurality of posts of the plug housing are retained within the multiple pairs of aligned openings via an adhesive.

14. The electrical connector according to claim 1, wherein at least one of:

the first annular flexible circuit board comprises opposing first side portions overlapping each other and joined together by a plurality of first solder bridges; or the second annular flexible circuit board comprises opposing second side portions overlapping each other and joined together by a plurality of second solder bridges.

15. The electrical connector according to claim 1, wherein at least one of:

the first annular flexible circuit board comprises opposing first side portions overlapping each other and joined together by an adhesive; or the second annular flexible circuit board comprises opposing second side portions overlapping each other and joined together by an adhesive.

16. The electrical connector according to claim 1, wherein at least one of:

the first annular flexible circuit board comprises opposing first sides interlocked with each other via a plurality of first interlocking features formed in the opposing first sides; or the second annular flexible circuit board comprises opposing second sides interlocked with each other via a plurality of second interlocking features formed in the opposing second sides.

17. The electrical connector according to claim 1, wherein the plug comprises an inner annular chamfer configured to slidably engage the first annular flexible circuit board as the plug is selectively connected with the receptacle and when the first annular flexible circuit is radially inwardly lopsided.

18. The electrical connector according to claim 17, wherein the plug comprises an outer annular chamfer configured to slidably engage the first annular flexible circuit board as the plug is selectively connected with the receptacle and when the first annular flexible circuit is radially outwardly lopsided.

19. The electrical connector according to claim 18, wherein the inner annular chamfer is axially offset, along a central axis of the electrical connector, relative to the outer annular chamfer.

20. The electrical connector according to claim 1, wherein:

the first electrical contacts are arranged in at least one receptacle annular pattern;

the first electrical contacts of the at least one receptacle annular pattern are not staggered relative to each other; and the first electrical contacts of any one of the at least one receptacle annular pattern are not staggered relative to the first electrical contacts of any other one of the at least one receptacle annular pattern.

21. The electrical connector according to claim 1, wherein:

the first electrical contacts are arranged in at least two receptacle annular patterns; and the first electrical contacts of a first one of the at least two receptacle annular patterns are staggered relative to the first electrical contacts of a second one of the at least two receptacle annular patterns.

22. The electrical connector according to claim 1, wherein:

the receptacle further comprises a first central interface concentric with the first annular flexible circuit board, located radially inwardly relative to the first annular flexible circuit board, and comprising first ones of electrical, fluidic, or pneumatic connectors;

the plug further comprises a second central interface concentric with the second annular flexible circuit board, located radially inwardly relative to the second annular flexible circuit board, and comprising second ones of electrical, fluidic, or pneumatic connectors; and when the plug is selectively connected with the receptacle, the first ones of the electrical, fluidic, or pneumatic connectors are electrically, fluidically, or pneumatically connected with corresponding ones of the second ones of the electrical, fluidic, or pneumatic connectors.

23. A system, comprising:

an electrical connector, comprising:

a receptacle comprising:

a first annular flexible circuit board; and electrical contacts coupled to the first annular flexible circuit board, electrically isolated from each other, and arranged in two receptacle annular patterns; and a plug comprising:

a second annular flexible circuit board; and flexible electrical contacts coupled to the second annular flexible circuit board, electrically isolated from each other, and arranged in two plug annular patterns;

wherein:

the plug is selectively connectable with the receptacle;

when the plug is selectively connected with the receptacle, each one of the electrical contacts of the receptacle is in physical contact with a corresponding one of the flexible electrical contacts of the plug; and when the plug is not selectively connected with the receptacle, each one of the flexible electrical contacts of a first one of the two plug annular patterns is in contact with a corresponding one of the flexible electrical contacts of a second one of the two plug annular patterns; and a tool electrically coupled with the plug.

24. The system according to claim 23, wherein the tool is configured to detect, by sensing a short circuit, whether any one of the flexible electrical contacts of the first one of the two plug annular patterns is in contact with the corresponding one of the flexible electrical contacts of the second one of the two plug annular patterns when the plug is selectively connected with the receptacle.

* * * * *